US010255748B2

(12) United States Patent
English

(10) Patent No.: US 10,255,748 B2
(45) Date of Patent: Apr. 9, 2019

(54) DATABASE AND SERVER FOR AUTOMATIC WAGERING

(71) Applicant: John English, Las Vegas, NV (US)

(72) Inventor: John English, Las Vegas, NV (US)

( * ) Notice: Subject to any disclaimer, the term of this patent is extended or adjusted under 35 U.S.C. 154(b) by 288 days.

(21) Appl. No.: 15/210,710

(22) Filed: Jul. 14, 2016

(65) Prior Publication Data

US 2017/0017657 A1 Jan. 19, 2017

Related U.S. Application Data

(60) Provisional application No. 62/192,502, filed on Jul. 14, 2015.

(51) Int. Cl.
*G06F 17/00* (2006.01)
*G07F 17/32* (2006.01)

(52) U.S. Cl.
CPC ........ *G07F 17/3211* (2013.01); *G07F 17/323* (2013.01); *G07F 17/3209* (2013.01); *G07F 17/3244* (2013.01); *G07F 17/3272* (2013.01); *G07F 17/3288* (2013.01)

(58) Field of Classification Search
None
See application file for complete search history.

(56) References Cited

U.S. PATENT DOCUMENTS

2003/0195043 A1* 10/2003 Shinners ................. G07F 17/32 463/42
2007/0021198 A1* 1/2007 Muir ....................... G07F 17/32 463/29
2007/0293320 A1* 12/2007 Nguyen .................. G07F 17/32 463/42
2008/0207310 A1 8/2008 Mindes
2012/0004036 A1 1/2012 Hill
2012/0015746 A1* 1/2012 Mooney ................ A63F 13/795 463/42
2014/0066191 A1* 3/2014 Yang ....................... A63F 13/10 463/29
2014/0370958 A1 12/2014 Lutnick

OTHER PUBLICATIONS

PCT International Search Report and the Written Opinion of the International Searching Authority dated Sep. 30, 2016 for International Application No. PCT/US 16/42338.

* cited by examiner

*Primary Examiner* — Paul A D'Agostino
(74) *Attorney, Agent, or Firm* — Howard & Howard Attorneys PLLC

(57) ABSTRACT

A system and method include a database configured to store results of wagers on at least one prior game for a plurality of players, a first server, a second server, and an application executable by a user computing device processor. The first server queries the database to receive the results of the wagers and to determine a ranked list of leaders based at least in part on the results of the wagers. The application presents the ranked list of leaders to a user, enables the user to select one of the leaders, and transmits data representative of the selected leader to the first server. The second server receives the selected leader from the first server and automatically links the user with the selected leader such that when the leader places a wager, the second server automatically places the same wager on behalf of the user.

28 Claims, 22 Drawing Sheets

DATABASE AND SERVER FOR AUTOMATIC WAGERING

CROSS-REFERENCE TO RELATED APPLICATIONS

The present application claims priority to U.S. Provisional Patent Application Ser. No. 62/192,502, filed Jul. 14, 2015, the entire disclosure of which is hereby incorporated by reference.

FIELD OF THE DISCLOSURE

The present disclosure relates generally to databases, and more specifically, to a database and server for automatic wagering.

BACKGROUND

Sports wagering is very popular with bettors and comprises a significant source of revenue for bookmakers. Additionally, sports betting provides a significant amount of tax revenue when conducted in jurisdictions in which sports betting has been legalized. Currently, in the United States, sports betting is only legal if bets are placed within the state of Nevada. Accordingly, bettors who wish to wager on sports games must be physically present in the state of Nevada.

Typically, wagers are placed on sports games in a race and sports book within a casino, for example. A player fills out a card with the desired wager amount and the outcome the player wishes to wager on. However, having to physically travel to a location that legally offers sports betting may be inconvenient and costly. As a result, some prospective bettors who would like to bet on sports games may be prevented or discouraged from doing so. This leads to a loss in gaming revenue for the state of Nevada, for race and sports books, and for casinos and other gaming establishments. Since people who bet on sports games are more likely to watch the games, this may also lead to a loss of advertising and other revenue for sports franchises and media distribution companies.

Some players also pay for so-called “tout” services in which betting experts provide recommended bets for the players to place in exchange for a fee. Such services can be expensive for the players, and the recommended bets provided by the experts may not end up winning. Accordingly, many times, the players may not reap the benefit of the tout fees paid.

The present disclosure is aimed at solving one or more of the problems identified above.

SUMMARY

In one embodiment, a system includes a database configured to store results of wagers on at least one prior game for a plurality of players. The system also includes a first server, a second server, and an application executable by a processor of a user computing device. The first server is configured to query the database to receive the results of the wagers for the plurality of players, and determine a ranked list of leaders based at least in part on the results of the wagers for the plurality of players. The application is configured to present the ranked list of leaders to a user using the application on the user computing device, enable the user to select one of the leaders, and transmit data representative of the selected leader to the first server. The second server is configured to receive the selected leader from the first server and automatically link the user with the selected leader such that when the leader places a wager, the second server automatically places the same wager on behalf of the user.

In another embodiment, a method includes storing results of wagers on at least one prior game for a plurality of players in a database, querying the database, by a first server, to receive the results of the wagers for the plurality of players, determining, by the first server, a ranked list of leaders based at least in part on the results of the wagers for the plurality of players, and presenting the ranked list of leaders to a user using an application executing on a user computing device. The method also includes enabling the user to select one of the leaders, transmitting data representative of the selected leader to the first server, receiving, by a second server, the selected leader from the first server, and automatically linking the user with the selected leader using the second server such that when the leader places a wager, the second server automatically places the same wager on behalf of the user.

BRIEF DESCRIPTION OF THE DRAWINGS

Advantages of the present disclosure will be readily appreciated, as the same becomes better understood by reference to the following detailed description, when considered in connection with the accompanying drawings. Non-limiting and non-exhaustive embodiments of the present disclosure are described with reference to the following figures, wherein like numerals refer to like parts throughout the various views unless otherwise specified.

DETAILED DESCRIPTION

Figure 1:
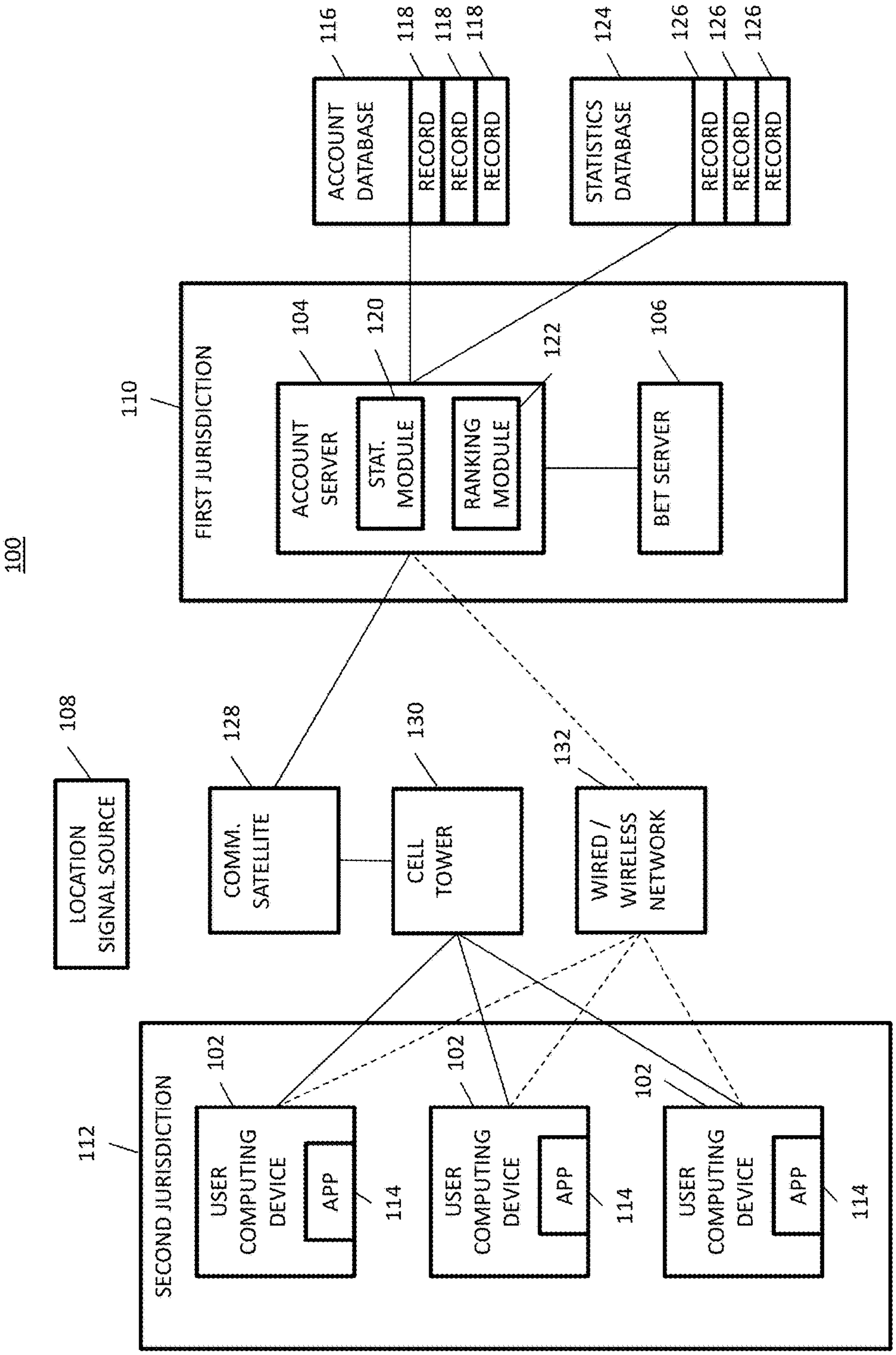
FIG. 1 is a block diagram illustrating an exemplary system that may be used to enable one or more users to place wagers on one or more games.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to “one embodiment”, “an embodiment”, “one example” or “an examples” means that a particular feature, structure or characteristic described in connection with the embodiment of example is included in at least one embodiment of the present invention. Thus, appearances of the phrases “in one embodiment”, “in an embodiment”, “one example” or “an example” in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system". Furthermore, the present invention may take the form of a computer program product embodied in any tangible media or expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisional via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagram(s) in the flow diagram(s) illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with" or "configured to be in communication with". This terminology is intended to be non-limiting, and where appropriate, be interpreted to include without limitation, wired and wireless communication using any one or a plurality of suitable protocols, as well as communication methods that are constantly maintained, are made on a periodic basis, and/or made or initiated on an as needed basis.

The present disclosure particularly describes a system and method for enabling users to engage in sports wagering in a convenient, efficient, and social manner. Users are able to create a sports wagering account on an account server and may access the account through an application executing on a user computing device. The account server includes a statistics module that stores statistics relating to the past wagering history of the users within one or more databases. The account server also includes a ranking module that uses the statistics to generate one or more ranked lists of leaders who either have the highest win percentage for one or more games, or who are otherwise identified as being a leader for one or more games. The users may choose one or more of the leaders to follow based on the ranked list or based on searching for the leaders through the application executing on the user computing device.

When a user selects a leader to follow, the account server transmits a follower request to a device operated by the leader. The leader may then approve the request by transmitting a follower approval from the leader's device to the account server. The account server may then link the betting activity of the user to the leader such that when the leader places a bet, a bet server connected to the account server may automatically place the same bet using wager limits set by the user. Accordingly, the user may not need to be an expert statistician or even be successful at sports wagering. Rather, the user may select leaders who are experts themselves or who have a proven track record of sports wagering and may automatically bet along with the selected leaders. In such a manner, users may have a more enjoyable experience with sports wagering.

In addition, the users are not required to stay within a legal jurisdiction after they have selected the leaders and wager limits. Rather, once the user's account is set up (which may need to occur within a legal jurisdiction), the bet server takes over and automatically places bets on behalf of the user in accordance with the bets placed by the leaders the user has chosen to follow regardless of where the user happens to be located. Accordingly, users may conveniently reap the benefits of the sports wagering while being located at any place the user desires.

In addition, by following leaders who have a proven track record of success (e.g., based on the documented win percentage), users may gain the benefit of placing wagers corresponding to the picks of the experts (i.e., the leaders) without having to pay tout fees or other fees to get betting picks from professional betting experts.

FIG. 1 is a block diagram of an exemplary system 100 that may be used to present one or wagering games to a player. As used herein, the term "wagering game" includes a contest or application in which a player is enabled to place a wager on the outcome of a game. In one embodiment, system 100 enables a player to bet or wager on an outcome of a professional sports game (i.e., sports wagering). Alternatively, system 100 may enable a player to place a wager on a poker game, a horse race, a blackjack game, or any other suitable game. As used herein, the term "wager" and "bet"

are used synonymously, and may involve real money wagering, "free to play" wagering with credits having no monetary or intrinsic value, or any combination thereof.

In one embodiment, system 100 includes one or more user computing devices 102, an account server 104, a bet server 106, and a location signal source 108 such as a global positioning satellite (GPS). The various components of system 100 may be connected together by one or more wired or wireless networks. Although three user computing devices 102 are illustrated in FIG. 1, system 100 may include any suitable number of user computing devices 102. Also, while system 100 is illustrated with the above components, it should be recognized that one or more components of system 100 may be combined together or split apart while remaining within the scope of the disclosure.

In one embodiment, account server 104 and bet server 106 are located within a first legal jurisdiction 110 and user computing devices 102 are located in one or more second legal jurisdictions 112. For example, account server 104 and bet server 106 may be located in a jurisdiction where sports wagering is legal (such as the state of Nevada), and user computing devices 102 may be located in one or more jurisdictions where sports wagering is illegal (such as outside the state of Nevada). As described more fully herein, account server 104 and bet server 106 may enable bets to be legally placed on behalf of the players while the players (and their user computing devices 102) are not in a jurisdiction where sports wagering is legal. While user computing devices 102 are illustrated in FIG. 1 as being located in second jurisdiction 112, it should be recognized that user computing devices 102 may be temporarily or permanently located in different jurisdictions from each other, may move between jurisdictions, or may be temporarily or permanently located in the same jurisdiction as account server 104 and bet server 106.

User computing device 102 is a computing device that may be operated by a user (sometimes referred to herein as a player) to place a wager on the game. User computing devices 102 may include a mobile phone, a personal digital assistant (PDA), a tablet computer, a wearable computing device, a laptop computer, a desktop computer, a kiosk, a point-of-sale terminal, a virtual reality device, an augmented reality device, or any other suitable computing device that enables the user computing device 102 to operate as described herein. In one embodiment, an application or "app" 114 is installed on each user computing device to enable the player to place a wager in the game. Alternatively, some or all of the functionality of user computing device 102 and/or application 114 may be embodied in a cashier-operated register, point-of-sale terminal, or the like.

Account server 104 is a computing device that enables multiple user computing devices 102 to place wagers on games. In one embodiment, account server 104 stores account information for each player in an account database 116 and associates the account information with the user computing device 102 that each player uses to access account server 104. The account information may be stored in a plurality of records 118 in account database 116. The records 118 may include a user name, a user password, a birth date, a scanned image of an identification document such as a driver's license or passport, funds available to the player stored in a digital wallet or the like, payment information including an account number to a financial institution used by the player to add funds to the digital wallet, and/or any other suitable information or record. Account server 104 may retrieve records 118 from account database 116 by querying account database 116 during operation.

In one embodiment, account server 104 includes a player statistics module 120 that tracks various statistics of each player and a ranking module 122 that ranks players and determines leaders for each game. For example, player statistics module 120 may track a number of times and the amounts the player has bet on a particular game, a number of times a player has won a bet, a number of times a player has lost a bet, which leaders the player has bet on or followed, and/or any other suitable statistic. The statistics of each player may be stored in a statistics database 124 as a plurality of records 126 and may be retrieved by querying statistics database 124. The records 126 and associated statistics may be transmitted to ranking module 122 or to another suitable server or module to aggregate the statistics of all the players. Alternatively, ranking module 122 may query statistics database 124 directly to receive the statistics of each player.

Ranking module 122 receives statistics of each player from player statistics module 120. Ranking module 122 aggregates the statistics, for example, to determine the leaders of each game. In one embodiment, the players who have the highest win percentage for each game are determined to be leaders of that game. For example, the 20 players with the highest win percentage for National Football League (NFL) sports wagering may be determined to be leaders of the NFL sports wagering game. Additionally or alternatively, other criteria may be used to determine the leaders of each game.

In one embodiment, celebrities or other well-known users may be determined to be leaders of one or more games. For example, celebrities or other well-known users may be included in a predefined list of leaders or possible leaders and ranking module 122 may select a predetermined number of celebrities or well-known users from the list to be leaders of one or more games. The selection may be random, may be based on the win percentage of each celebrity or well-known user, or may be based on any other suitable criteria. As described more fully herein, users may choose to follow the bets of one or more leaders (sometimes referred to as "back wagering") in a "Follow The Leader" game so that when the leader places a wager on a game, the followers of that leader automatically place the same wager on the same game.

Alternatively, a user may decide to follow one or more other users who may not be identified as a leader by win percentage or other criteria. For example, the user may choose to form a betting group with friends or other selected users. If the user forms or joins such a group, one of the users in the group may be selected to be a leader of that group. Accordingly, as used herein, the term "leader" encompasses a user who is selected to be a leader of a group of other users or a user who is otherwise selected to be a leader by one or more other users.

Bet server 106 is a computing device coupled to account server 104 that provides wagering services to users. Bet server 106 is located in first jurisdiction 110 where wagering is legal. Bet server 106 receives data from account server and places wagers on behalf of users based on the data received. For example, a leader may place a wager on a game using a user computing device 102. Account server 104 receives the wager and transmits the data representative of the wager to bet server 106. Bet server 106 then places the wager and transmits any win amount resulting from the wager to account server 104. Alternatively, bet server 106 transmits a notification of a win resulting from the wager to account server 104 and account server 104 determines the win amount. Account server 104 receives the win amount from a payment system of the bookmaker associated with the game or another suitable system and deposits the win amount in a digital wallet or other account of the user who placed the wager.

Location signal source 108 transmits signals to user computing devices 102, account server 104, and/or bet server 106 to enable a location of the devices and/or servers to be determined. In one embodiment, location signal source 108 includes one or more global positioning satellites (GPS). Alternatively or additionally, location signal source 108 may include a cellular tower, a wireless router or access point, and/or any other suitable signal source that enables the devices to determine their location.

In one embodiment, system 100 includes devices that enable user computing devices 102 to transmit and receive data to and from account server 104. The devices may include one or more communication satellites 128, one or more cellular towers 130, and devices forming one or more wired or wireless networks 132. In one embodiment in which user computing devices 102 are cellular phones, the user computing devices 102 may communicate with account server 104 by transmitting signals to cellular tower 130 which then transmits the signals to communication satellite 128. Communication satellite 128 transmits the signals to account server 104. In turn, account server 104 may transmit signals to user computing devices 102 in the reverse direction via communication satellite 128 and cellular tower 130. Additionally or alternatively, user computing devices 102 may communicate with account server 104 via one or more wired or wireless networks 132, such as the Internet.

In an exemplary embodiment, the signals transmitted between user computing devices 102 and account server 104 are encrypted using a suitable encryption algorithm. For example, the signals may be encrypted using a public key infrastructure (PKI) algorithm. Alternatively, the signals may be encrypted using any suitable algorithm.

Figure 2:
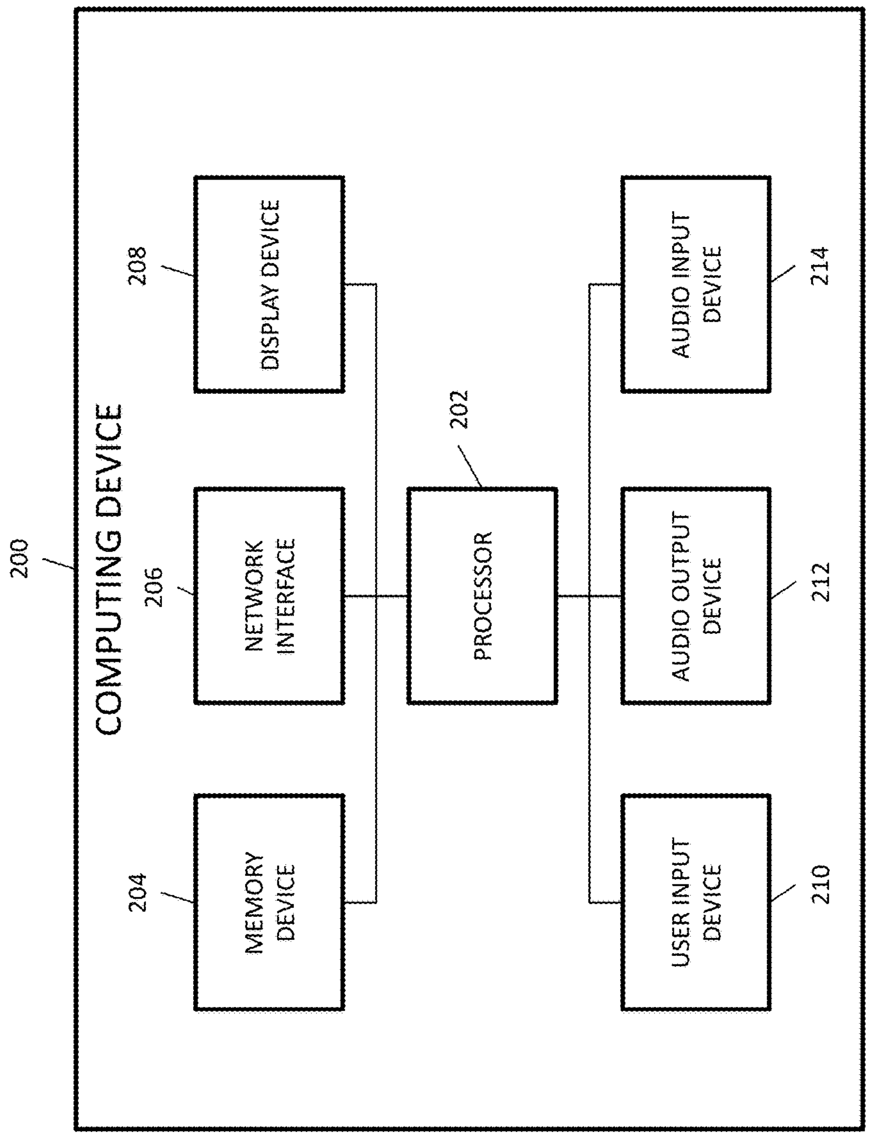
FIG. 2 is a block diagram of a computing device that may be used with the system shown in FIG. 1.

FIG. 2 is a block diagram of a computing device 200 that may be used with system 100 (shown in FIG. 1). More specifically, the user computing device 102, account server 104, and/or bet server 106 described in system 100 may be implemented as a computing device 200. However, it should be recognized that one or more components of computing device 200 may be not be included in user computing device 102, account server 104, and/or bet server 106.

Computing device 200 includes a processor 202, a computer-readable memory device 204, and a network interface 206. In one embodiment, computing device 200 may also include a display device 208, a user input device 210, an audio output device 212, and/or an audio input device 214. It should be recognized that memory device 204, network interface 206, display device 208, and user input device 210 (if provided) may be connected to processor 202 and/or to each other via any suitable bus or busses, interfaces, or other mechanisms.

Processor 202 includes any suitable programmable circuit including one or more microcontrollers, microprocessors, application specific integrated circuits (ASICs), systems on a chip (SoCs), programmable logic circuits (PLCs), field programmable gate arrays (FPGAs), and/or any other circuit capable of executing the functions described herein. The above examples are exemplary only, and thus are not intended to limit in any way the definition and/or meaning of the term "processor."

Memory device 204 is an electronic storage device that includes one or more non-transitory computer readable medium, such as, without limitation, random access memory (RAM), flash memory, a hard disk drive, a solid state drive, a compact disc, a digital video disc, and/or any suitable memory. Memory device 204 may include data as well as instructions that are executable by processor 202 to program processor 202 to perform the functions described herein. For example, the methods described herein may be performed by one or more processors 202 executing instructions stored within one or more memory devices 204.

Network interface 206 may include, without limitation, a network interface controller (NIC) or adapter, a radio frequency (RF) transceiver, a public switched telephone network (PSTN) interface controller, or any other communication device that enables computing device 200 to operate as described herein. In one embodiment, network interface 206 may connect to network interfaces 206 of other computing devices 200 of system 100 through a network using any suitable wireless or wired communication protocol.

Display device 208 may include, without limitation, a liquid crystal display (LCD), a vacuum fluorescent display (VFD), a cathode ray tube (CRT), a plasma display, a light-emitting diode (LED) display, a projection display, a display integrated into a virtual reality or augmented reality device, and/or any suitable visual output device capable of displaying graphical data and text to a user. For example, display device 208 may be used to display a graphical user interface associated with application 114 to the user.

User input device 210 may include, without limitation, a keyboard, a keypad, a touch screen, a mouse, a scroll wheel, a pointing device, a video input device that registers movement of a user (e.g., usable with an augmented reality input device or a virtual reality input device), and/or any other suitable device that enables the user to input data into computing device 200 and/or retrieve data from computing device 200.

Audio output device 212 may include, without limitation, one or more speakers or any other device that enables content to be audibly output from computing device 200. For example, music or other audio content associated with one or more games may be audibly output from audio output device 212.

Audio input device 214 may include a microphone or another suitable device that enables the user to input audio commands into computing device 200. Audio input device 214 may employ speech recognition software to convert spoken commands from the user into digital data for use in operating computing device 200.

While the foregoing computing device components have been described as being included within a computing device 200, it should be recognized that at least some computing devices 200 may not include each component. For example, a server may not include audio output device 212, audio input device 214, user input device 210, and/or display device 208. In addition, a computing device 200 may include any suitable number of each individual computing device component. For example, a computing device 200 may include a plurality of processors 202 or processor cores, a plurality of memory devices 204 (of the same or different types, sizes, etc.), and/or a plurality of display devices 208.

Figure 3:
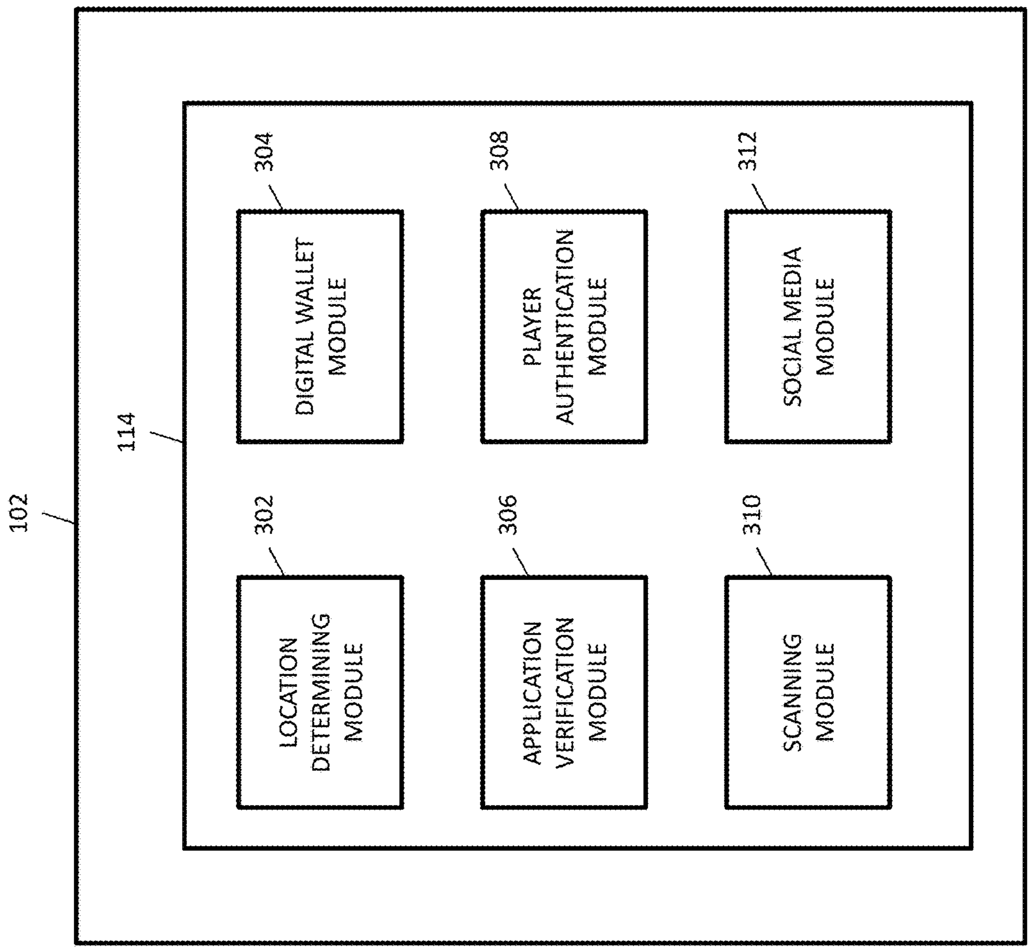
FIG. 3 is a block diagram of an exemplary application that may be used with the user computing device shown in FIG. 1.

FIG. 3 is a block diagram of an exemplary application 114 that is executable on user computing device 102 and that may be used with system 100 (shown in FIG. 1). More specifically, user computing device 102 may include a plurality of modules that may be embodied as one or more software modules within application 114. Alternatively, each module may include firmware and/or hardware components in addition to, or instead of, the software components within application 114. The modules may include, for example, a location determining module 302, a digital wallet 304, an application verification module 306, a player authentication module 308, a scanning module 310, and a social media module 312.

Location determining module 302 may be executed by processor 202 to determine the geographical location of user computing device 102. In one embodiment, location determining module 302 receives a signal from location signal source 108, such as one or more global positioning satellites, and determines a location of user computing device 102 based on the signal. In a specific embodiment, location determining module 302 receives signals from multiple satellites and determines the location of user computing device 102 by triangulating the signals. In another embodiment, location determining module 302 receives signals from other suitable location signal sources 108, such as cellular towers, wireless routers or access points, or the like and determines the location of user computing device 102 using the signals in a similar manner as described above with reference to the GPS signals.

Digital wallet module 304 is a module that stores payment or account information and funds that may be used to wager in games accessible through application 114. The information and funds are securely stored in encrypted files within digital wallet module 304. The information and funds may be unlocked or decrypted using, for example, a password, a pin number, a pattern entered into user input device 210, a scan of the user's fingerprint, and/or any other suitable key. Wagers or bets placed on games provided through application 114 are deducted from the funds stored in digital wallet module 304. Additionally, funds may be added to the digital wallet module 304 by linking a bank or other suitable account to the digital wallet module 304 and transmitting a funding request to the bank or other holder of the account.

Application verification module 306 may be executed by processor 202 to verify the integrity of application 114 to account server 104. For example, when processor 202 uses application 114 to initiate a connection with account server 104, account server 104 may request application integrity or verification information from application verification module 306 to ensure that application 114 has not been tampered with or otherwise altered in an unauthorized manner. Accordingly, application verification module 306 may calculate and store a digital fingerprint of application 114, such as by executing a hash algorithm on the files of application 114. The resulting application fingerprint may be stored in application verification module 306 (or another suitable portion of memory device 204) and may be transmitted to account server 104 in response to receiving an application verification or integrity request from account server 104. Account server 104 may compare the application fingerprint to a reference fingerprint stored on account server 104 to verify the application fingerprint (and thus the application 114). If the application fingerprint matches the reference fingerprint, application 114 (and by extension, user computing device 102) may be verified and may be allowed to access account server 104 to place wagers, for example.

Player authentication module 308 may be executed by processor 202 to authorize a player (also referred to as a user) to access application 114 on user computing device 102 and/or to access account server 104 using user computing device 102. For example, when a user opens or accesses application 114 using user computing device 102, player authentication module 308 may prompt the user to enter a username and password, or another suitable access key such as a fingerprint or secure key fob, to access application and/or to log in to account server 104. Player authentication module 308 may transmit a connection request to account server 104 with the username and password (or other access key) entered by the user. Account server 104 may compare the username and password (or a fingerprint of either or both) to a stored record containing the correct username and password of the user. If the username and password are correct, account server 104 may enable application 114 (and user computing device 102) to access the user's account on account server 104 and to place wagers using the account, for example.

Scanning module 310 may be executed by processor 202 to capture an image of a user identification document, such as a passport or driver's license. The image may be stored in scanning module 310 (or another suitable portion of memory device 204) and may be transmitted to account server 104 to enable the user to sign up for an account as discussed more fully herein. Scanning module 310 may also capture an image of the user's face for identification purposes, and/or may capture an image of a barcode or the like.

Social media module 312 may be executed by processor 202 to display social media feeds or other content to the user. The social media feeds may be transmitted by account server 104 or by another suitable server coupled to user computing device 102. Social media module 312 may also be used to log the user into one or more social media accounts to enable the user to post content on the social media accounts and to access friend or contact lists, for example.

Figure 4:
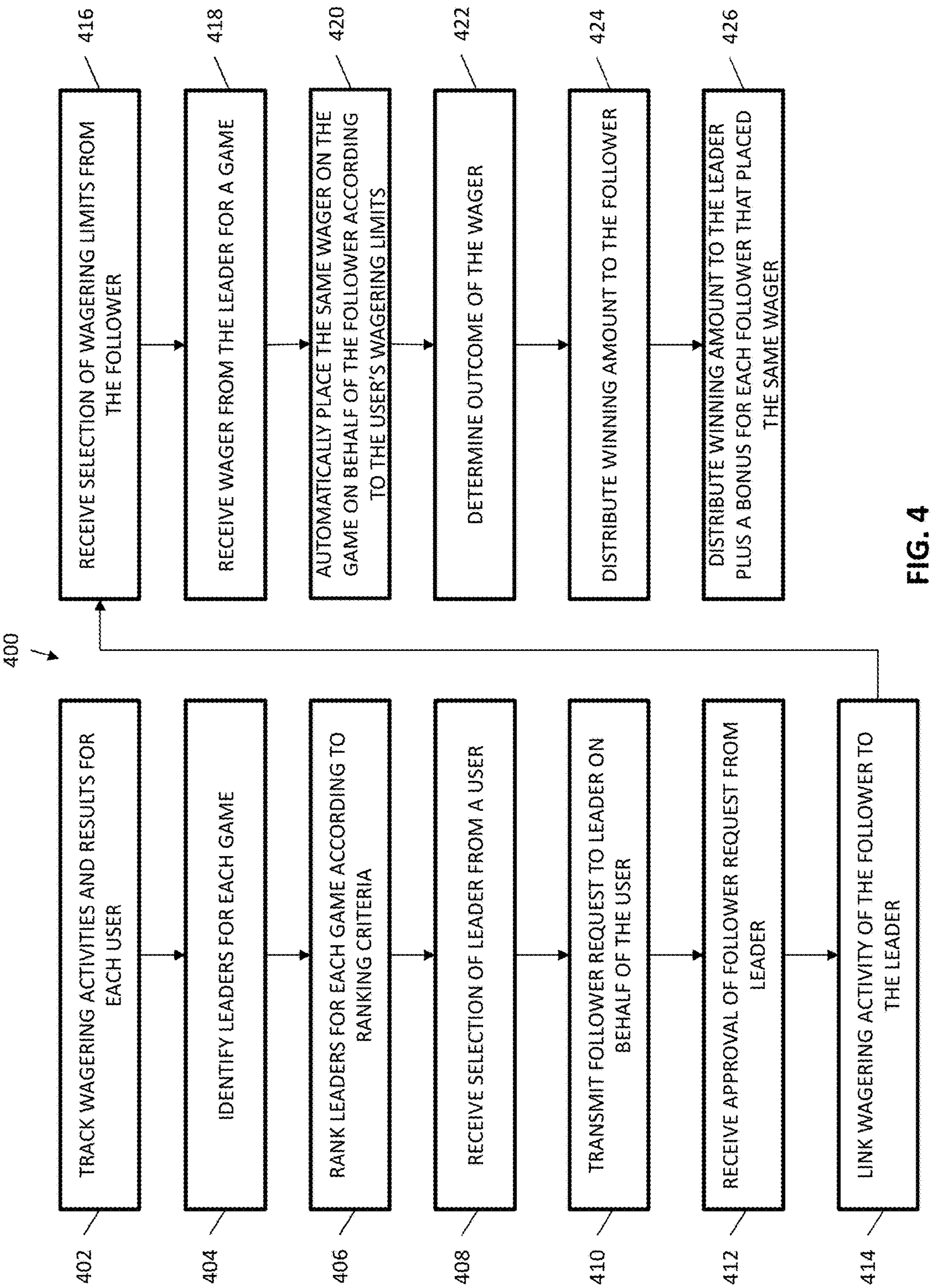
FIG. 4 is a flow diagram of an exemplary method of wagering on a game that may be used with the system shown in FIG. 1.

FIG. 4 is a flow diagram of an exemplary method 400 of wagering or betting on a game, such as a sports game, that may be used with system 100 (shown in FIG. 1). While method 400 is described with reference to a sports wagering game, it should be recognized that method 400 may be used with any suitable wagering game, such as poker, blackjack, horse racing, and the like. Method 400 may be implemented by user computing device 102, account server 104, and/or bet server 106 (shown in FIG. 1), such as by a processor 202 of user computing device 102, account server 104, and/or bet server 106 executing computer-readable instructions stored within a memory device 204 of user computing device 102, account server 104, and/or bet server 106. Alternatively, method 400 may be implemented by any suitable device of system 100.

In one embodiment, a user of a user computing device 102 accesses a sports wagering application (or app), such as application 114, to wager on one or more sports games. For example, a user may use a cellular phone to access the application to place one or more wagers on one or more games.

In one embodiment, wagering activities and results are tracked 402 for each user who is using system 100 to wager on one or more games. For example, as each user places a wager on a game, the wager details are tracked and stored by account server 104 or bet server 106 in statistics database 124. The results of each wager (e.g., whether the user won the wager), are also stored in statistics database 124.

Leaders are then identified 404 for each game. For example, ranking module 122 may query statistics database 124 after each game concludes to determine which users have the highest win percentage for the particular game or game type and may select those users to be leaders. Alternatively, ranking module 122 may query statistics database 124 periodically, such as every 5 minutes, every hour, every day, or at any other suitable frequency to determine which users have the highest win percentage. In one embodiment, ranking module 122 selects a predetermined number of the users with the highest win percentage for a game to be leaders of that game. While ranking module 122 is described herein as selecting the predetermined number of users with the highest win percentage, it should be recognized that other criteria may be used to select the leaders in addition to, or instead of, the highest win percentage. For example, ranking module 122 may select the users with the highest total number of wins for a game to be leaders of the game, may select one or more predetermined leaders that are not based on wagering or win statistics such as one or more celebrities, sports stars, or well-known public figures, and/or may select leaders using any other suitable criteria.

The selected leaders for each game are then ranked 406 according to one or more ranking criteria. For example, the ranking criteria may include the number of wagers won, the win percentage of the user, alphabetical ranking based on user name, geographical ranking based on proximity to the user or based on a location or jurisdiction of the user, any combination of the foregoing, and/or any other suitable ranking criteria. The ranked list of leaders for each game may be transmitted to user computing device 102 to be displayed on display device 208.

A user may then select one of the leaders in the ranked list to follow to enable the user to automatically place the same wagers that the leader places as described more fully herein. User computing device 102 transmits the selection of the leader to account server 104. Account server 104 receives 408 the selection of the leader from the user and stores the selection of the leader as a record in account database 116 and/or statistics database 124.

In one embodiment, a selection of a leader by a user indicates a desire to become a follower of that leader. However, the leader may have the discretion to accept or reject the proposed followers. Accordingly, in one embodiment, account server 104 transmits 410 a follower request to the selected leader on behalf of the user. If the selected leader approves the follower request, the user computing device of the leader transmits a follower approval to account server 104. Account server 104 receives 412 the approval of the follower request and stores the association of the user (follower) and the leader in account database 116 and/or statistics database 124 and transmits a notification to bet server 106 that the user is now a follower of the selected leader.

Bet server 106 automatically links 414 the wagering activity of the user or follower to the leader in response to the approved follower request. As a result, if the leader places a wager in a game, bet server 106 automatically places the same wager in the same game on behalf of the follower, although with the exception that the wager amount may be different as discussed below.

Once the user has selected the leader, the user is prompted to enter one or more wagering limits for wagers placed under that leader. For example, the user may be prompted to enter a percentage value of the amount wagered by the leader and a maximum cap of the amount to be wagered. Account server 104 receives 416 the selected wager limits from the user's computing device 102 and transmits the wager limits to bet server 106 for use in determining the limits of any future wagers. Accordingly, when bet server 106 automatically places a wager on behalf of the user, the amount of the automatic wager will be the amount wagered by the leader multiplied by the percentage value selected by the user. If the amount of the user's automatic wager exceeds the maximum cap, the amount of the wager is automatically reduced by bet server 106 to be equal to the maximum cap.

A wager from the leader is received 418 for a game by bet server 106 and the amount to be wagered by each follower of the leader is calculated by bet server 106 as described above. Bet server 106 then places the wager for the leader and automatically places 420 the same wager on the same game on behalf of each follower according to each follower's wagering limits described above.

In one embodiment, bet server 106 is configured to ensure that the amounts wagered by each leader and their followers does not exceed a predetermined limit for risk reduction or regulatory purposes. As used herein, a leader and his or her followers will be collectively referred to as a "leader group." Accordingly, bet server 106 may aggregate the amounts to be wagered by each leader group and may determine whether the aggregate wager amount exceeds a predetermined threshold. If the aggregate wager amount for a leader group exceeds the threshold, bet server 106 may automatically reduce the aggregate wager amount to be equal to or less than the threshold. For example, bet server 106 may reduce the amount to be wagered by the leader and each follower of the leader group by the same percentage or the same fixed amount to reduce the overall leader group wager amount to be equal to the threshold. In a specific embodiment, bet server 106 may reduce each wager amount by the following amount to effectuate an equal reduction across all bettors in a leader group:

$$R=(W-T)/N \quad \text{EQ. 1}$$

where R is the amount to reduce each wager, W is the total aggregated amount of the leader group's original amount to be wagered, T is the threshold amount, and N is the number of users in the leader group including the leader. Accordingly, if 10 users are in a leader group (including the leader) and each user bets $100 but the threshold for a leader group wager amount is $900, bet server 106 will automatically reduce each user's wager amount by $10 (($1000–$900)/10). Alternatively, bet server 106 may reduce each user's wager amount by an equal amount but may keep the leader's wager amount unchanged. Still alternatively, bet server 106 may reduce each user and/or leader's wager amount by any suitable percentage or value as desired.

Bet server 106 may aggregate all amounts to be wagered by a leader group into a single wager and may bet the single aggregated wager amount in the game on behalf of all bettors in the leader group. If the leader group's aggregated wager amount is determined to exceed the threshold, however, bet server 106 may split the single aggregated wager amount into a plurality of smaller amounts instead of reducing each user's wager amount. Bet server 106 may transmit a plurality of wager requests with the smaller (split) wager amounts to one or more servers located in other jurisdictions to be placed as separate wagers in those jurisdictions, for example.

Bet server 106 determines 422 the outcome of the wager (e.g., whether each leader and follower won the wager) and distributes 424 an associated winning amount to each follower that won the wager. In one embodiment, an associated winning amount is distributed 426 to the leader plus a bonus for each follower that placed a wager under the leader. The bonus may be a predetermined percentage of the amount wagered by each follower, a predetermined number of credits that can be redeemed for merchandise, virtual content, cash, or the like, and/or any other suitable bonus. Alternatively, the leader is only awarded a winning amount corresponding to the amount the leader wagered.

Figure 5:
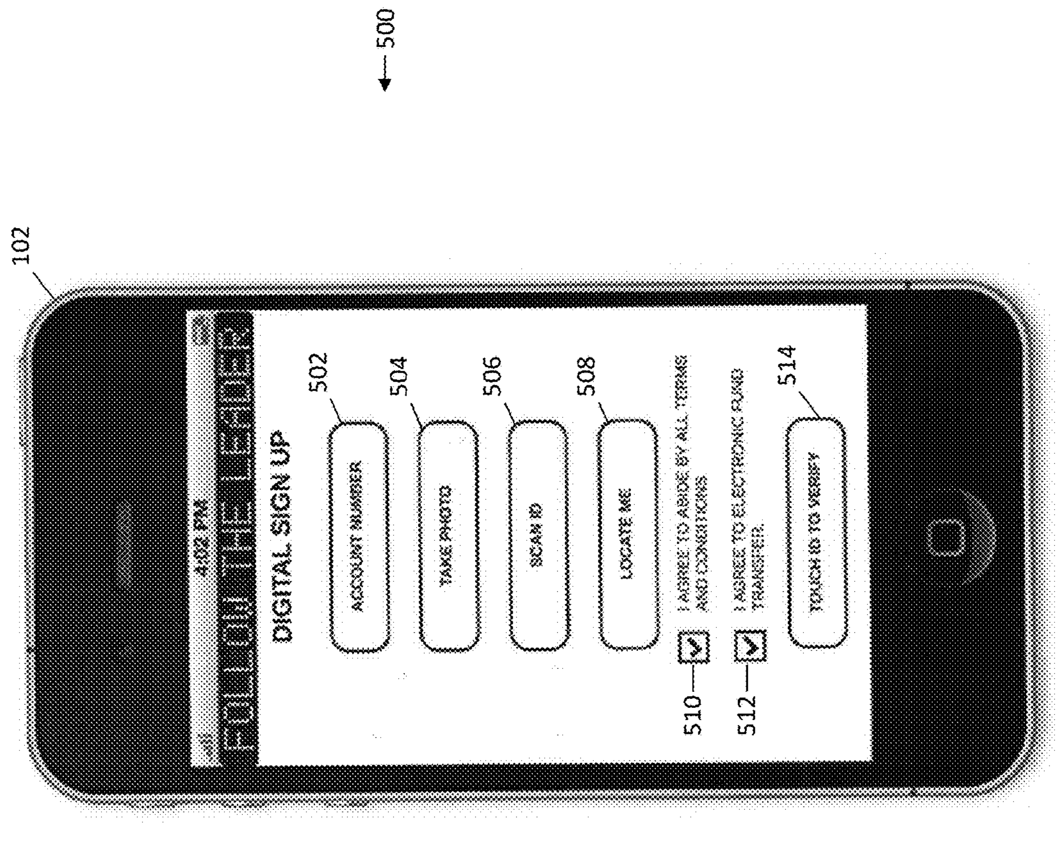
FIGS. 5-22 are screen captures of exemplary user interfaces that may be used with the user computing device shown in FIG. 1.

FIG. 5 is a screen capture showing an exemplary user interface 500 of a sports wagering application, such as application 114 (shown in FIG. 1). While the following user interfaces are illustrated in FIGS. 5-22 as being presented on a mobile phone, it should be recognized that the user interfaces may be presented on any suitable user computing device 102.

User interface 500 illustrates an exemplary user account creation or sign up process that may be implemented by application 114. In an exemplary embodiment, a user creates an account on account server 104 and/or application 114 by selecting an appropriate icon on user interface 500. As part of the account creation process, the user may be presented with a plurality of selectable icons or selectable portions of the user interface (hereinafter referred to as "buttons") with which to enter information needed for creating the account. The buttons may include, for example, an account number button 502, a photo button 504, a scan button 506, a location button 508, a terms and conditions button 510, an electronic funds transfer (EFT) agreement button 512, and a fingerprint scanning button 514.

The user may select account number button 502 to enter a bank account number or another suitable financial institution account number for the account. The user may select photo button 504 to capture an image of the user's face using a camera of the user computing device 102, for example. The user may also scan an identification document, such as a passport or a driver's license, using scan button 506. Scan button 506 may in turn cause processor 202 to execute scanning module 310 which initiates a camera or bar code scanner of user computing device 102 to capture the image.

Location button 508 may be operated by the user to determine a current location of user computing device 102 (and by extension, a current location of the user). Location button 508 may cause processor 202 to execute location determining module 302 to determine the location of user computing device 102. Terms and conditions button 510 may be accessed by the user to agree to the terms and conditions for the account, while EFT agreement button 512 enables the user to agree to fund the account and/or digital wallet by EFT. Fingerprint scanning button 514 may be operated to confirm an identity of the user by scanning a fingerprint of the user and comparing the scanned fingerprint to stored fingerprint data for the user.

Once the user has entered all required information, an account may be created on account server 104 and may be linked to the user and/or user computing device 102. Alternatively, an account is created through a web page and is linked to application 114 through the user entering a web site-provided account number into application 114 through account number button 502.

In one embodiment, the user computing device 102 must be located in a jurisdiction where wagering is legal, such as first jurisdiction 110, in order to access features of application 114 and/or system 100. For example, the user computing device 102 may be required to be located within first jurisdiction 110 in order to set up an account (i.e., a wagering account) on application 114 and/or account server 104, to initially identify leaders to follow and/or wagering limits for the leaders, and/or to otherwise set up the automatic wagering through account server 104 and/or bet server 106. Once the account, leaders, and/or wagering limits are set up, bet server 106 may thereafter automatically place all future wagers on behalf of the player regardless of where the user and/or the user computing device 102 is located.

In this embodiment, the user computing device 102 location is confirmed by geolocation. More specifically, processor 202 may use location determining module 302 to receive location signals from location signal source 108 and/or may transmit location signals to one or more devices or components of system 100 to determine the location of user computing device 102. User computing device 102 may transmit signals representative of the determined location of user computing device 102 to account server 104 and/or bet server 106. Once account server 104 and/or bet server 106 confirm that the user computing device 102 is located within first jurisdiction 110, the user may then be authorized to set up the account, identify leaders, set up wagering limits, and/or to otherwise set up the automatic wagering.

Accordingly, user computing device 102 and system 100 may enable the player to maintain the ability to place wagers on games even if the user is unable to access account server 104, bet server 106, and/or other devices or components of system 100. For example, if the user computing device 102 loses network access to account server 104, if the account has already been created and the leaders and wagering limits have been set up, bet server 106 may continue to automatically place bets on behalf of the player even when the user travels to a location without internet access or if the user computing device 102 otherwise loses network access to account server 104. As a result, the player's ability to consistently and uninterruptedly place wagers on desired games is improved. In addition, since bet server 106 automatically places wagers on behalf of the user, the user may not need to periodically use user computing device 102 to access account server 104 to place the wagers. As a result, if the user computing device 102 is a portable device such as a cellular phone or a tablet computing device that includes a battery, the battery life of the device may be improved.

Figure 6:
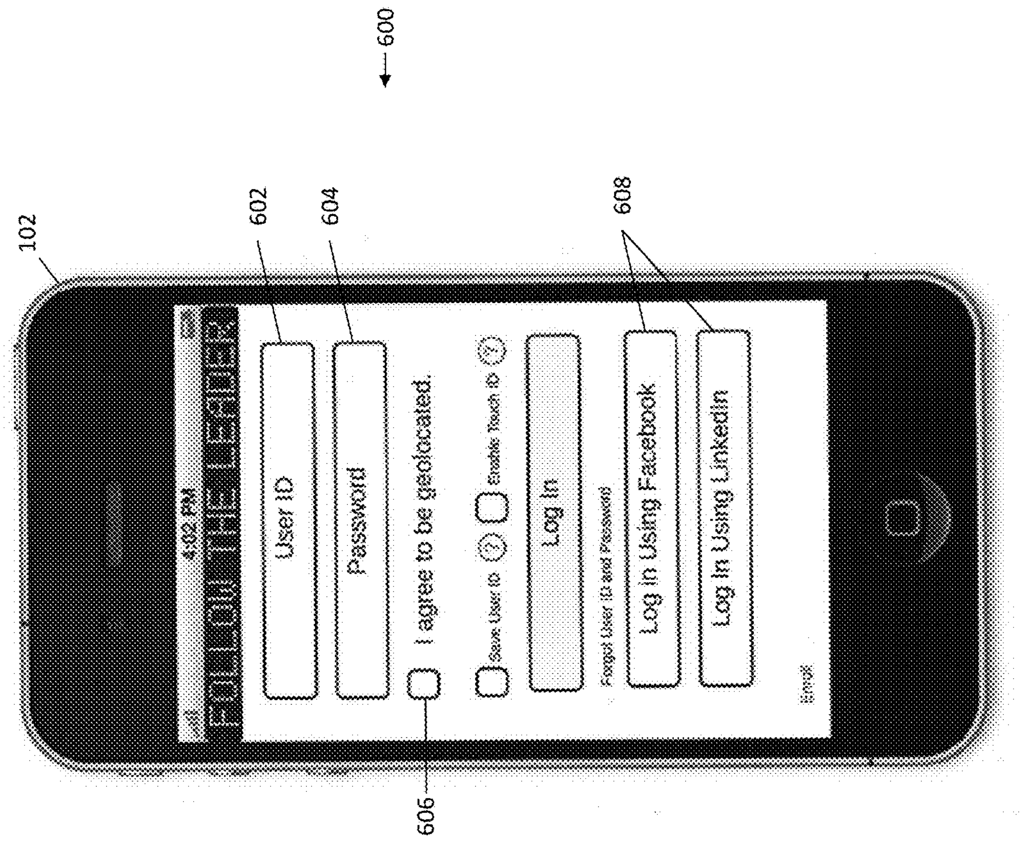

FIG. 6 is a screen capture showing another exemplary user interface 600 of a sports wagering application, such as application 114 (shown in FIG. 1).

User interface 600 may be presented to the user to enable the user to log into application 114 and/or account server 104 when the user opens or accesses application 114. The user may be presented with a user ID button 602 to enable the user to enter an account name, number, or other identifier for the account, and may be presented with a password button 604 to enter a password for the account. The user may be required to agree to being geolocated by selecting a geolocation agreement button 606 in order to access application 114 and/or account server 104. The user may also be presented with one or more social media login buttons 608. Social media login buttons 608 enable the user to log into one or more social media accounts of the user through application. In one embodiment, selecting one of the social media login buttons 608 causes processor 202 to execute social media module 312 to cause social media module 312 to access the user's account or accounts on one or more social media sites.

Figure 7:
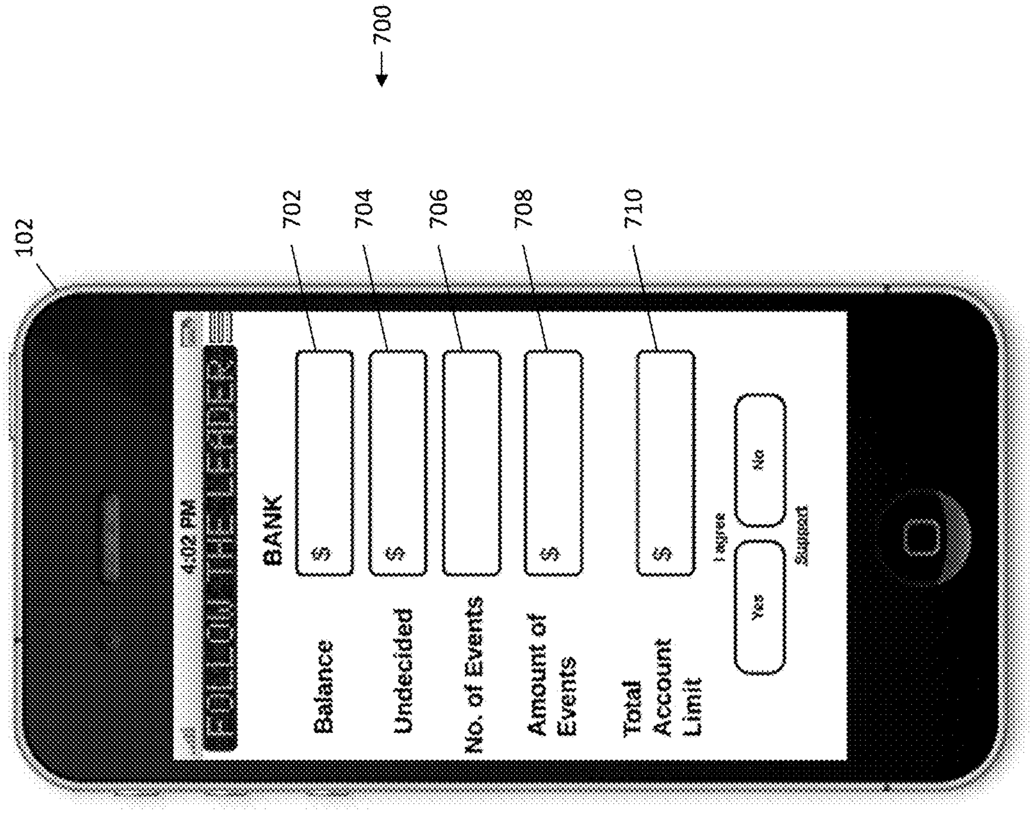

FIG. 7 is a screen capture showing an exemplary user interface 700 of a sports wagering application, such as application 114 (shown in FIG. 1).

User interface 700 enables the user to enter wager information to be used for wagering on one or more games. User interface 700 may display a balance amount 702 representing the amount of money in digital wallet module 304, an undecided amount 704 representing an amount of money that has not yet been wagered, a number of events 706 or games that the user has wagered on, an aggregated amount 708 that the player has wagered on the events or games, and a total account limit 710 that the user is able to wager on one or more games or events. The user may be prompted to agree or disagree with the settings described herein with respect to FIG. 7. If the user agrees to the settings, application 114 transmits the settings to account server 104 and/or to bet server 106 for use in placing wagers on games.

Figure 8:
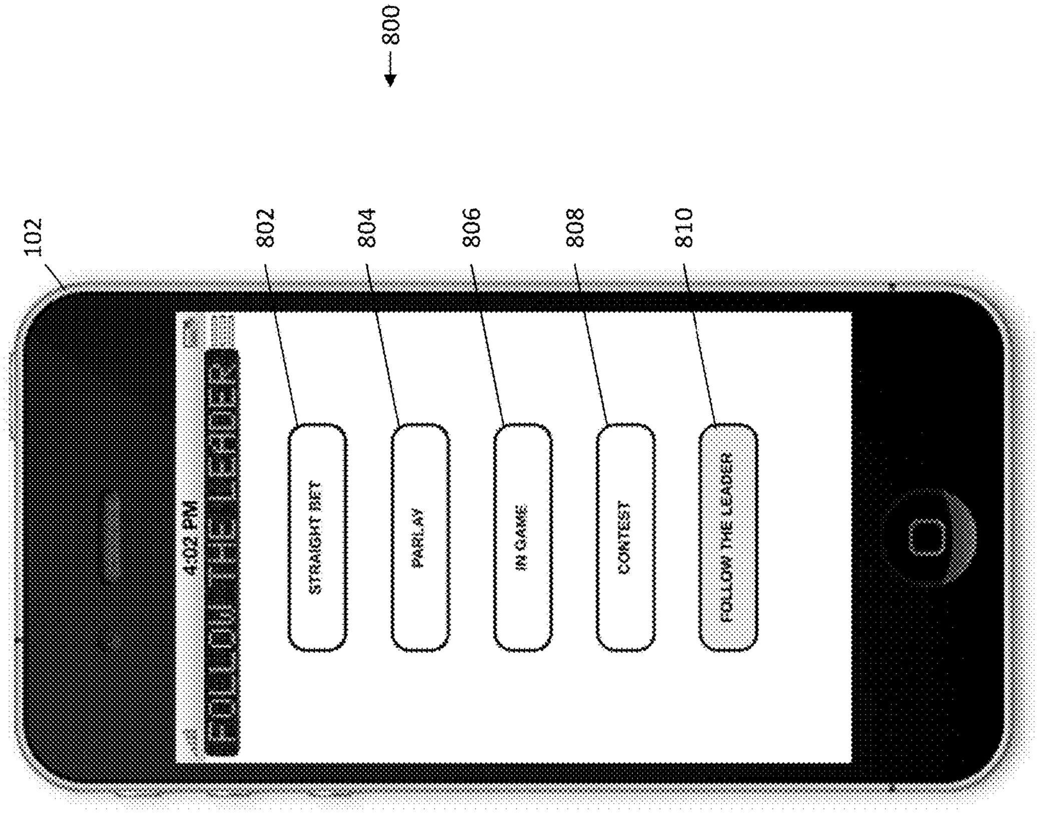

FIG. 8 is a screen capture showing an exemplary user interface 800 of a sports wagering application, such as application 114 (shown in FIG. 1).

User interface 800 enables the user to select a game or type of wagering activity to engage in. For example, the user may select a straight bet button 802 to enter a straight bet on a game, a parlay button 804 to enter a parlay wager, an in game button 806 to enter an in game wager, a contest button 808 to enter a contest wager, and a follow the leader button 810 to enable the player to enter a wager in a Follow The Leader game (described above). The selected wager type is transmitted to account server 104 and/or bet server 106 for use in placing the wagers on the selected game.

Figure 9:
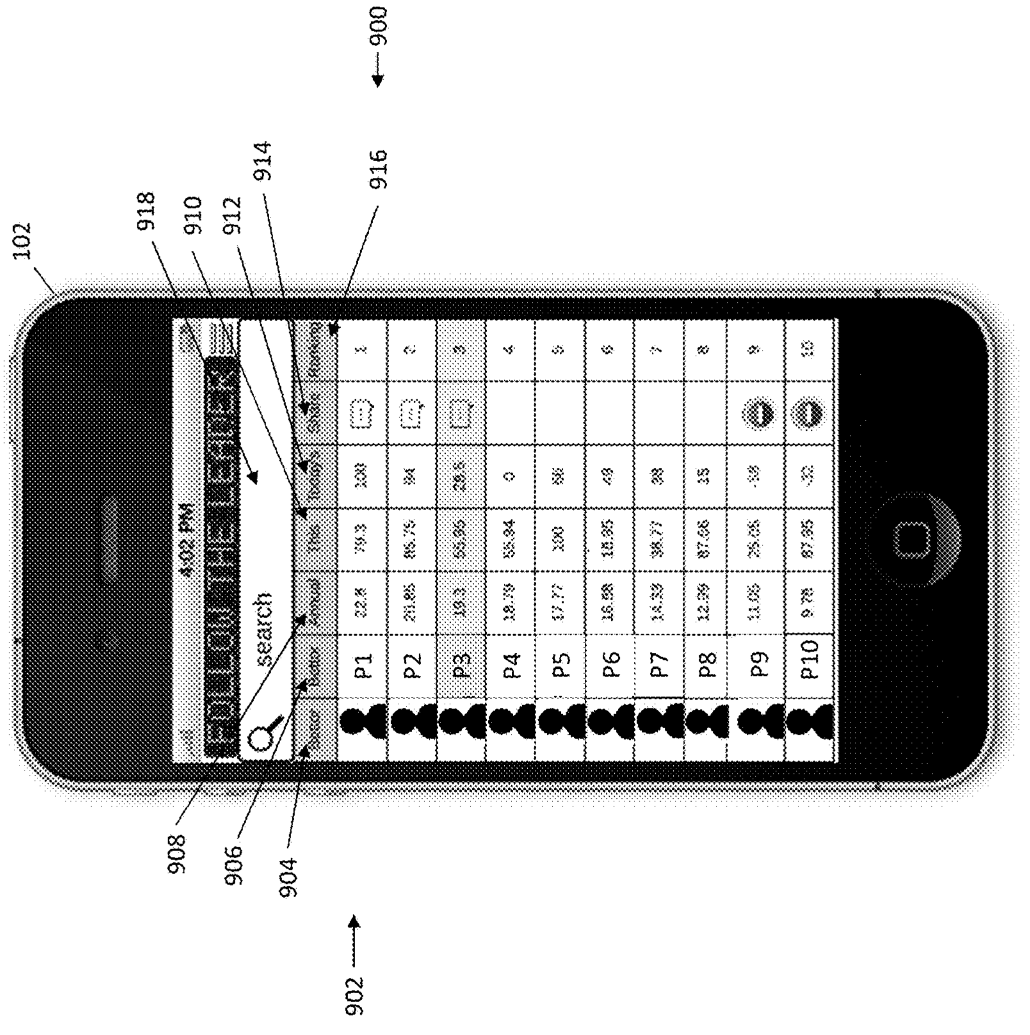

FIG. 9 is a screen capture showing an exemplary user interface 900 of a sports wagering application, such as application 114 (shown in FIG. 1). More specifically, user interface 900 illustrates a portion of a "Follow The Leader" game that may be presented to the user.

In the Follow The Leader game, ranking module 122 (shown in FIG. 1) creates an ordered or ranked list of users who have wagered on a game. The rankings of the users in the list may be based on the total win percentage for a particular game, a win percentage for the game within a predefined period (such as the last month, the last 7 days, the last day, etc.), a total number of wins, a number of wins within a predefined period (such as the last month, the last 7 days, the last day, etc.), and/or any other suitable criterion or criteria. Ranking module 122 may also rank users by team (i.e., win percentage for betting on individual sports teams), for example. Ranking module 122 may query statistics database 124 to determine the ranked list and may transmit data representative of the ranked list to application 114 to enable application 114 to display the ranked list to the user.

In the example shown in FIG. 9, user interface 900 presents a ranked list 902 of users or bettors in a table format including columns for each bettor picture 904, bettor name 906, annual win percentage 908 over all games, win percentage 910 for a game selected by the user (such as NFL football), a daily win percentage 912 for the current day, a share column 914 that enables the user to share or make private a status of win percentages or other wagering statistics with other users, and an overall ranking 916. User interface 900 may also present a search box 918 in which the user may enter portions of a leader's name to search for that leader's profile (shown in FIG. 10).

Figure 10:
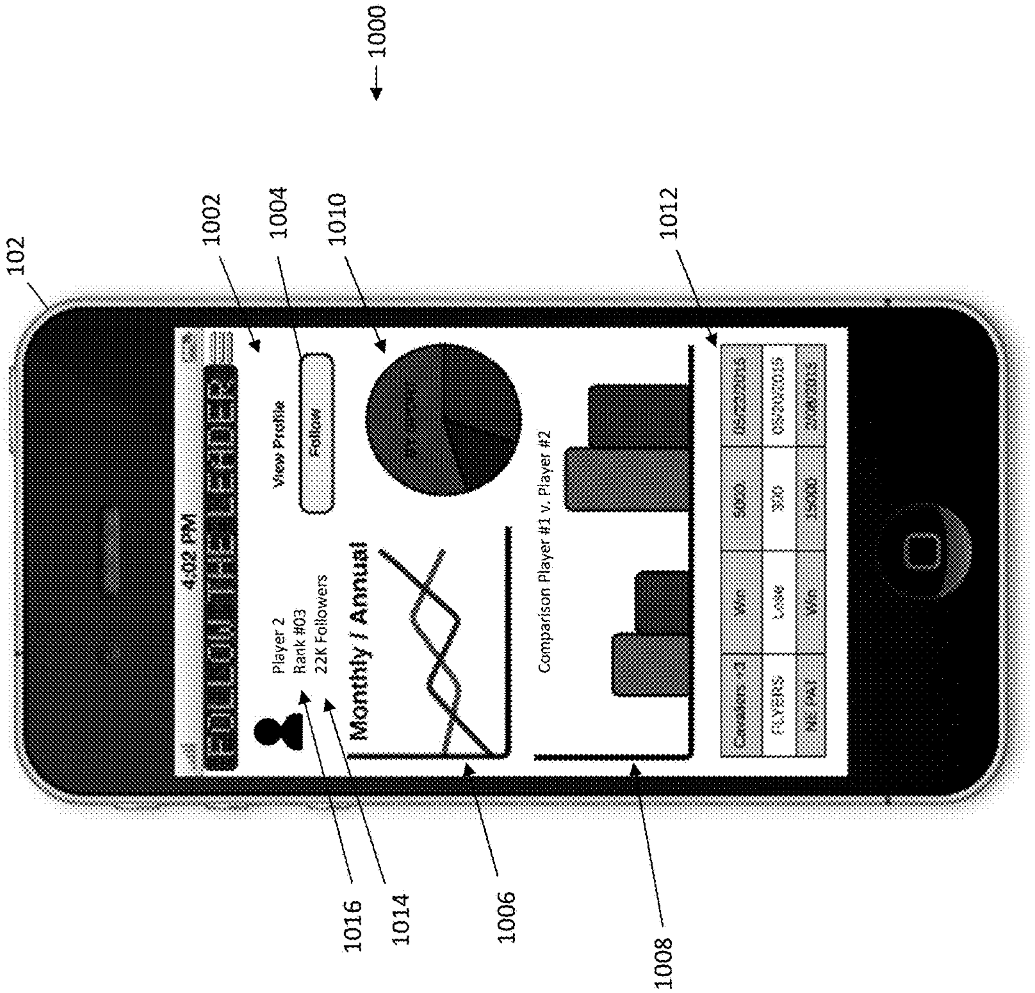

FIG. 10 is a screen capture showing an exemplary user interface 1000 of a sports wagering application, such as application 114 (shown in FIG. 1). More specifically, user interface 1000 illustrates a leader profile 1002 that may be viewed by a user.

Figure 14:
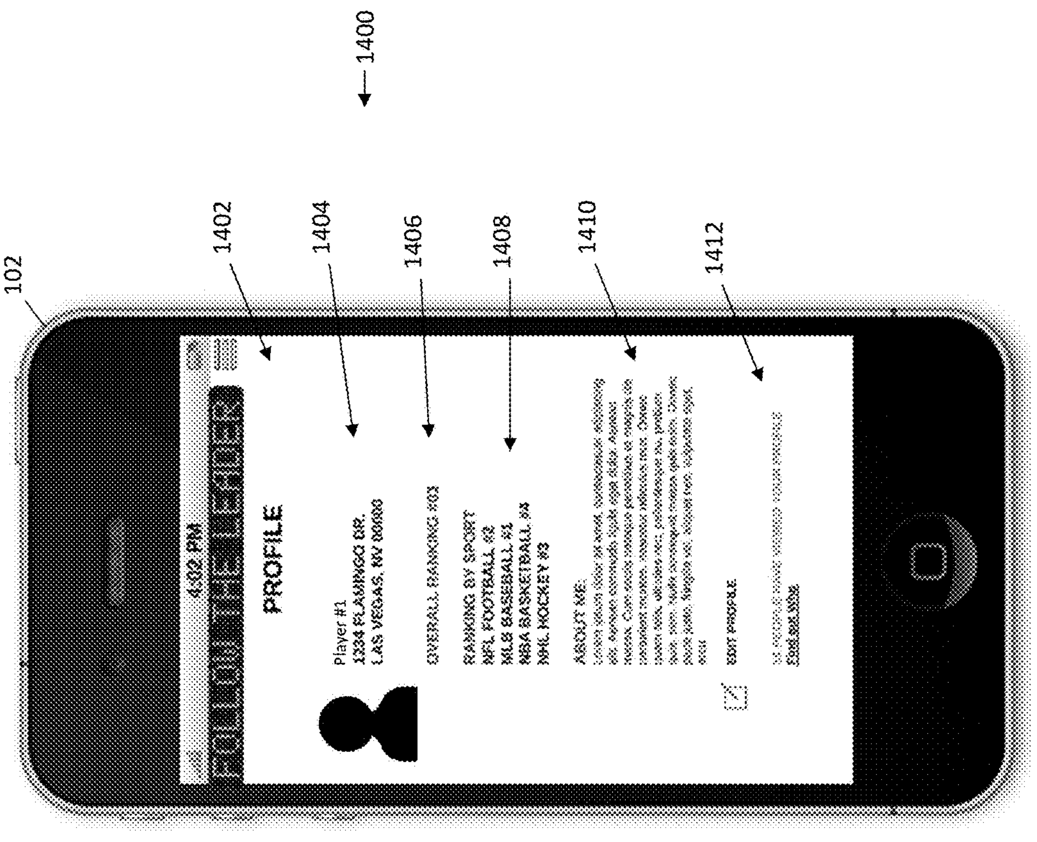

User interface 1000 may display leader profile 1002 to the user, for example, in response to the user searching for the leader via search box 918 (shown in FIG. 9) or by selecting the leader's name or picture in ranked list (shown in FIG. 9). While profile 1002 is described herein as a leader profile 1002, it should be recognized that each user may have a viewable profile that is similar to the profile illustrated in FIG. 10. One example user profile is shown in FIG. 14.

Leader profile 1002 may include a follow button 1004 that enables a user to submit a follower request to the leader in order to become a follower of the leader. If the user selects the follow button 1004, application 114 transmits a follower request to account server 104 which in turn transmits the follower request to a device operated by the leader. The leader may either approve or reject the follower request. If the leader approves the follower request, account server 104 receives the approval from the leader's device and links the wagering activity of the follower to the leader. In this manner, when the leader places a wager on a game, bet server 106 automatically places the same wager on the same game subject to any wager limits or caps the player designates.

Leader profile 1002 may also include a comparison of the leader's wagering history with the user's wagering history. The comparison may be presented in the form of a line graph 1006 or a bar graph 1008 that illustrates the win percentage of the leader compared to the win percentage of the user. Leader profile 1002 may also illustrate the leader's win percentage by sport in a pie chart 1010 and/or may illustrate the leader's recent wagering results in a table format 1012.

Leader profile 1002 may also show the number of followers 1014 the leader has and the overall rank 1016 of the leader in the ranked list 902 (shown in FIG. 9). In one embodiment, leaders may only be allowed to have a predetermined number of followers to minimize the risk associated with too many users following the same leader.

Figure 11:
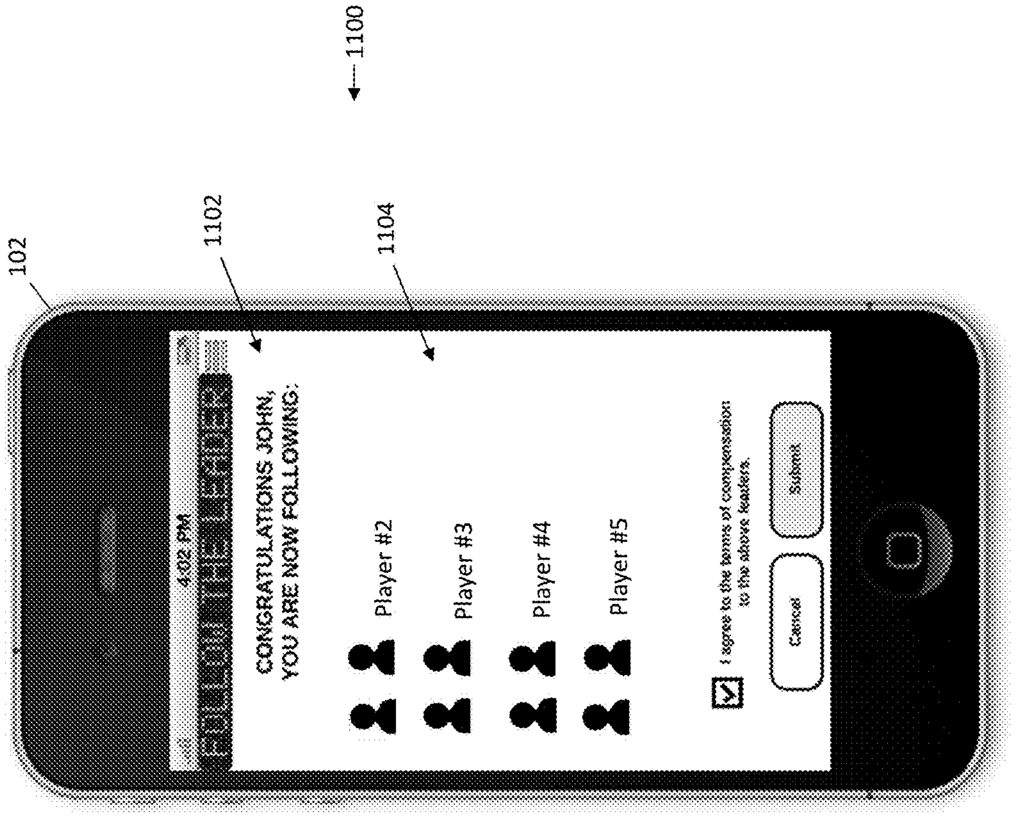

FIG. 11 is a screen capture showing an exemplary user interface 1100 of a sports wagering application, such as application 114 (shown in FIG. 1). More specifically, user interface 1100 illustrates an acceptance screen 1102 notifying the user that his or her follower request was approved by the leader in response to the user selecting the follow button 1004 on the leader's profile, for example.

In one embodiment, user interface 1100 displays a list 1104 of all leaders that the user is following. The user may be prompted to agree to the terms of following a leader which may include a compensation agreement for the leader. The compensation agreement may include a bonus that is distributed to the leader by bet server 106 if the leader wins a bet with followers automatically placing the same bet by virtue of their linked wagering activities. The bonus may be a portion of the winnings received by the user (and each other follower of the leader), such as 5%, 1%, or any other suitable portion or percentage. Alternatively, the bonus may be a predetermined number of credits distributed by bet server 106 that may be redeemed by the leader for merchandise, money, or the like.

Figure 12:
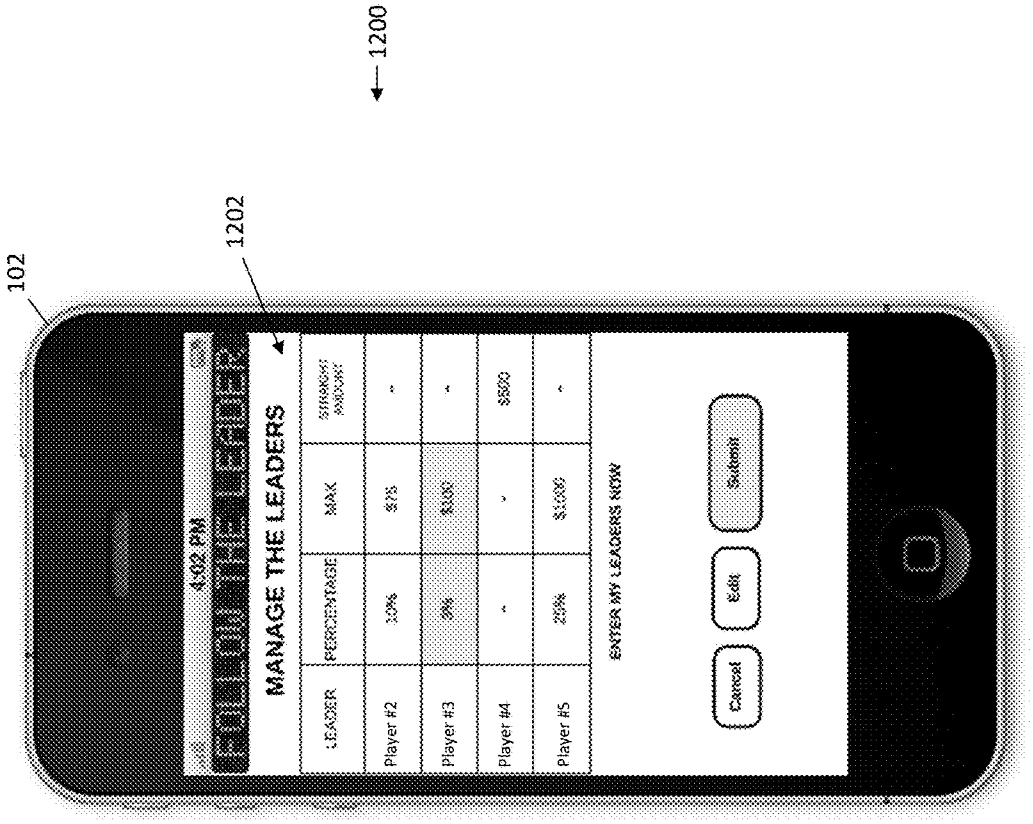

FIG. 12 is a screen capture showing an exemplary user interface 1200 of a sports wagering application, such as application 114 (shown in FIG. 1). More specifically, user interface 1200 illustrates a leader management interface 1202 that enables the user to adjust wagering amounts and limits for the leaders the user is following.

In one embodiment, user interface 1200 enables the user to enter a percentage value that represents the portion of the leader's wager amount that will be automatically wagered on behalf of the user when the leader places the wager. For example, if the user enters a percentage value of 10% for a leader, if that leader places a wager of $500, bet server 106 will automatically place a wager of $50 on behalf of the user (i.e., $500×10%). The user may also set a maximum wager amount or cap that applies to wagers placed on behalf of the user. Using the example above, if the user enters a percentage value of 10% with a maximum wager amount or cap of $75 and the leader places a wager of $1000, bet server 106 will automatically reduce the $100 wager amount that would otherwise be placed on behalf of the player (i.e., $1000×10%) to $75.

Alternatively, the user may select a fixed amount to be wagered on behalf of the player each time the leader places a wager. As illustrated in FIG. 12, the user may set different percentage values, maximum wager amounts, and fixed wager amounts for each leader.

Figure 13:
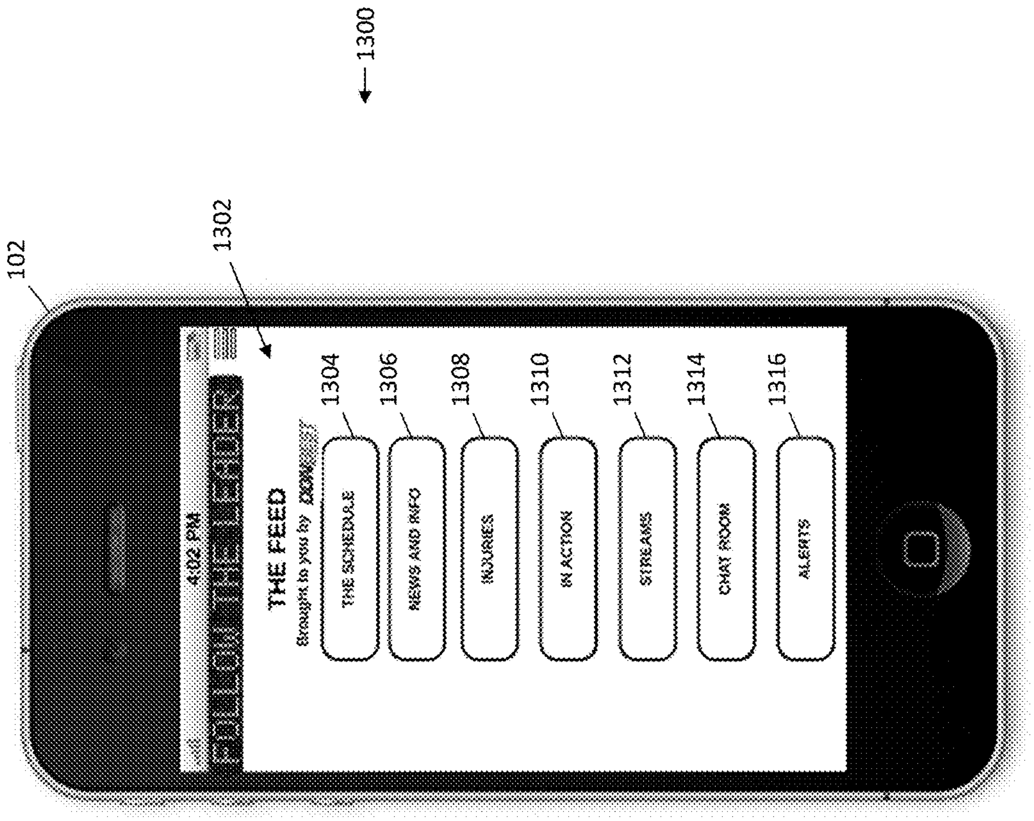

FIG. 13 is a screen capture showing an exemplary user interface 1300 of a sports wagering application, such as application 114 (shown in FIG. 1). More specifically, user interface 1300 illustrates a social media interface 1302 that enables the user to receive one or more informational feeds from one or more sources. Social media interface 1302 may receive the feeds through social media module 312 (shown in FIG. 3).

In one embodiment, the user may select a schedule button 1304 to receive a schedule of games to be played, a news button 1306 to receive a news feed that provides game-related news to the user, and an injuries button 1308 to receive notices of any injuries to players of one or more games. The user may also select an in action button 1310 to display statistics or other data of games that are in progress, a streams button 1312 to display one or more video streams of games being played, a chat room button 1314 to enter a chat room where the user can participate in discussions regarding the games, and an alerts button 1316 to receive notices or alerts regarding games or wagers the player has placed. The buttons and functionality described herein are exemplary only, and it should be recognized that different buttons and functionality may be provided as desired.

FIG. 14 is a screen capture showing an exemplary user interface 1400 of a sports wagering application, such as application 114 (shown in FIG. 1). More specifically, user interface 1400 illustrates a user profile 1402 that displays details about the user and/or user's account.

User profile 1402 may include, for example, an address 1404 of the user, an overall ranking 1406 over all games, a ranking 1408 by individual sport or game, a narrative portion 1410 describing the user, and a display 1412 of the number of users who have viewed the profile. In some embodiments, only a portion of the information displayed on user profile 1402 is visible to others viewing the profile. For example, address 1404 may be only viewable by the user and may be hidden from others viewing user profile 1402.

Figure 15:
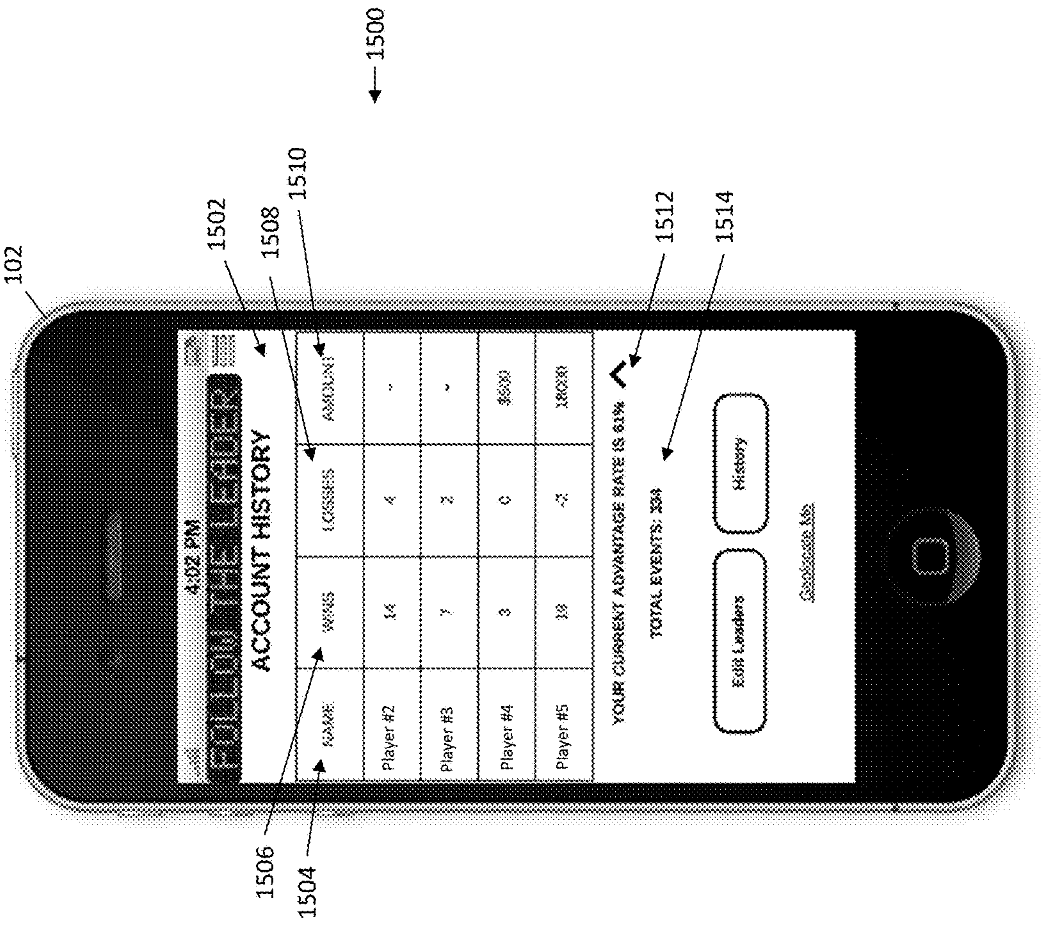

FIG. 15 is a screen capture showing an exemplary user interface 1500 of a sports wagering application, such as application 114 (shown in FIG. 1). More specifically, user interface 1500 illustrates an account history 1502 of the user.

Account history 1502 may include, for example, a history of wagers and associated results in the Follow The Leader game or another suitable game. For example, account history 1502 may list the leaders 1504 that the user is following, the number of wins 1506 and losses 1508 the user has experienced betting under the respective leader, and the total amount wagered 1510 under the respective leader. In addition, account history 1502 may include a current advantage rate 1512 of the user and the total number of events 1514 the user has participated in or wagered on.

Figure 16:
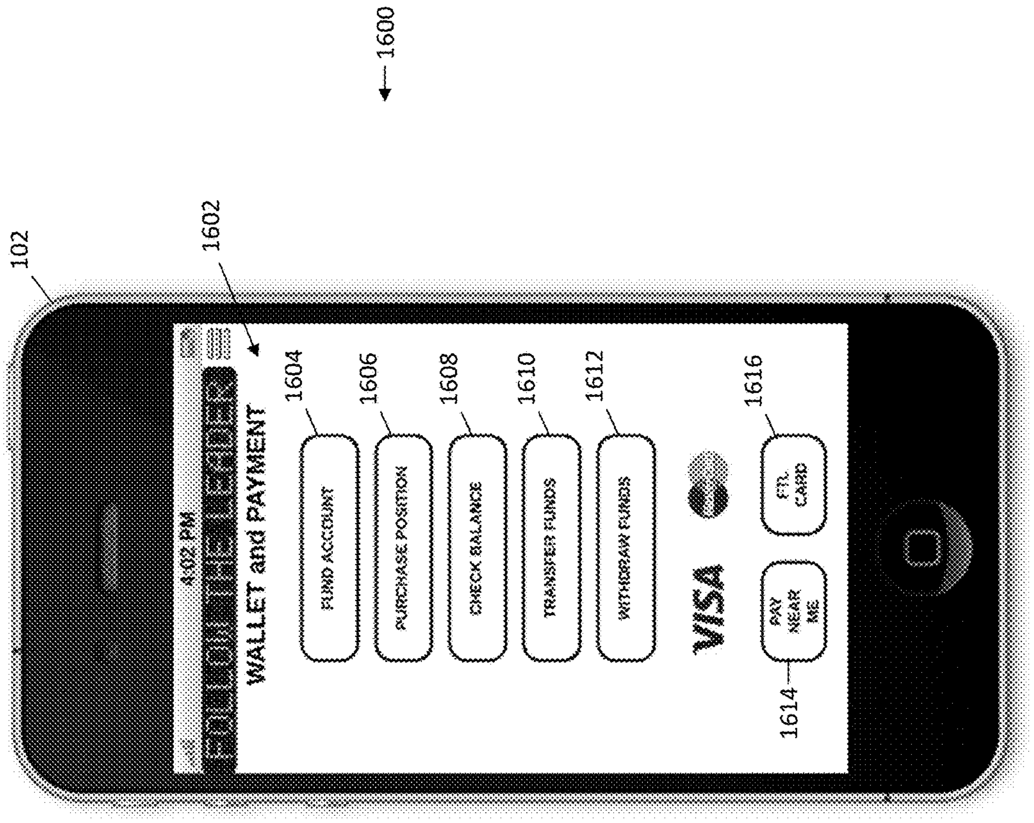

FIG. 16 is a screen capture showing an exemplary user interface 1600 of a sports wagering application, such as application 114 (shown in FIG. 1). More specifically, user interface 1600 illustrates a digital wallet interface 1602 for the user. In an exemplary embodiment, digital wallet interface 1602 is the user interface to digital wallet module 304 (shown in FIG. 3) and receives data therefrom.

Digital wallet interface 1602 includes a fund account button 1604 that enables the user to add money to the digital wallet from a linked payment account or other account at a financial institution. Digital wallet interface 1602 may also include a purchase position button 1606, a check balance button 1608, a transfer funds button 1610, a withdraw funds button 1612, a proximity payment button 1614, and a card transfer button 1616. Purchase position button 1606 enables the user to purchase a position behind a leader if the leader already has the maximum amount of followers or if a maximum wager threshold for all of the users in the leader group has been met (e.g., the wager threshold described above with reference to FIG. 4). A cost of the purchased position may be split between the operator of system 100 (or another suitable party) and the leader according to a predetermined split percentage or agreement. Check balance button 1608 enables the user to check the amount of funds available in the digital wallet. Transfer funds button 1610 enables the user to transfer money to another account. Withdraw funds button 1612 enables the user to transfer money out of digital wallet and into an account of the user at a financial institution, for example. Proximity payment button 1614 enables the user to purchase tickets or place wagers via a near field communication device integrated within user computing device 102 or another suitable proximity-enabled payment device. Card transfer button 1616 enables the user to add funds stored in or referenced by a payment card, such as a prepaid or gift card associated with application 114 and/or system 100.

Figure 17:
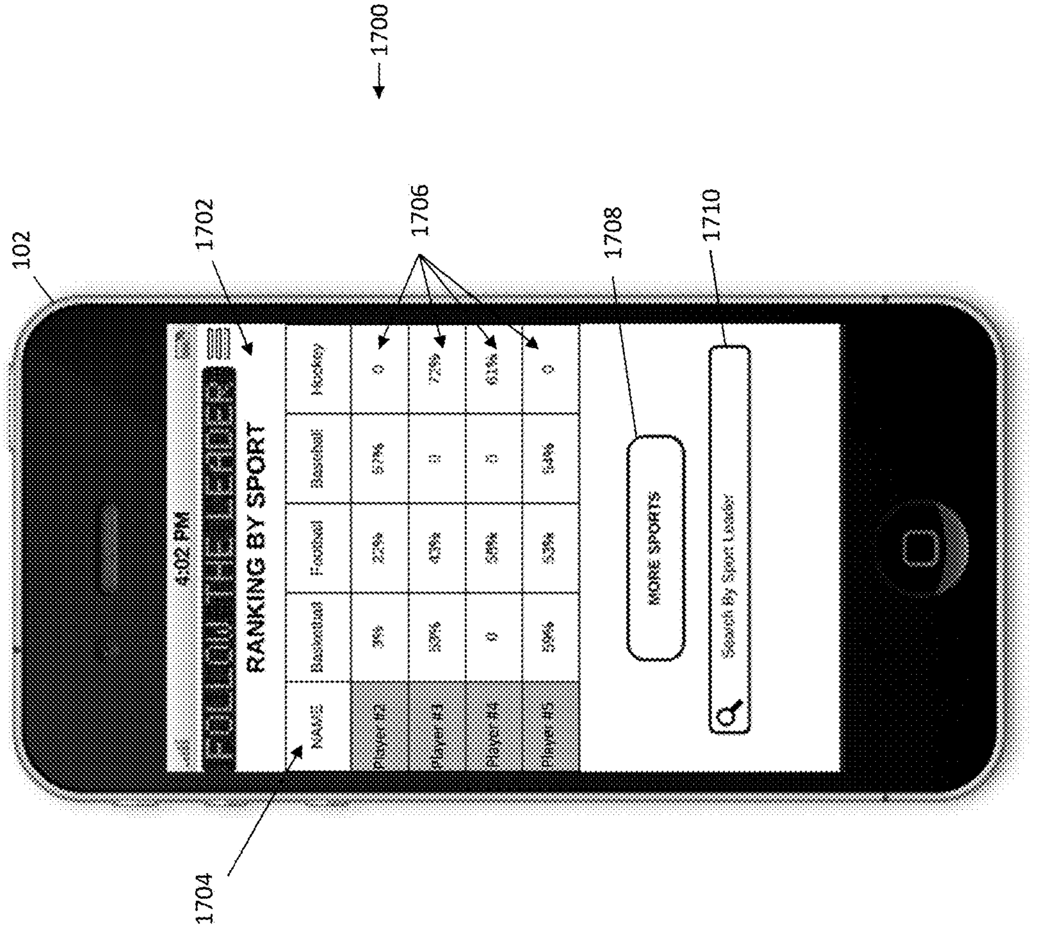

FIG. 17 is a screen capture showing an exemplary user interface 1700 of a sports wagering application, such as application 114 (shown in FIG. 1). More specifically, user interface 1700 illustrates a ranked list 1702 of leaders arranged by sport. Ranked list 1702 may be compiled by ranking module 122 (shown in FIG. 3) by querying statistics database 124 as described above.

For example, ranked list 1702 may identify each leader 1704 that the user is following as well as the win percentage 1706 of each leader for each of a plurality of sports or other games or events. In one embodiment, the sports listed on ranked list 1702 are customizable by the user such that the user may select the sports to be displayed on list 1702. For example, the user may select an additional sports button 1708 to display additional sports or events that the user wishes to see on ranked list 1702. As illustrated in FIG. 17, ranked list 1702 enables a user to quickly identify which sports, games, or events a particular leader has performed strongly in, and which sports, games, or events a particular leader has performed poorly in. Ranked list 1702 may also enable the user to select a sport leader search button 1710 to search for the leaders in each sport, event, or game. Accordingly, the user may make an informed choice in which leader to follow and may follow different leaders for different sports, games, or events as desired.

Figure 18:
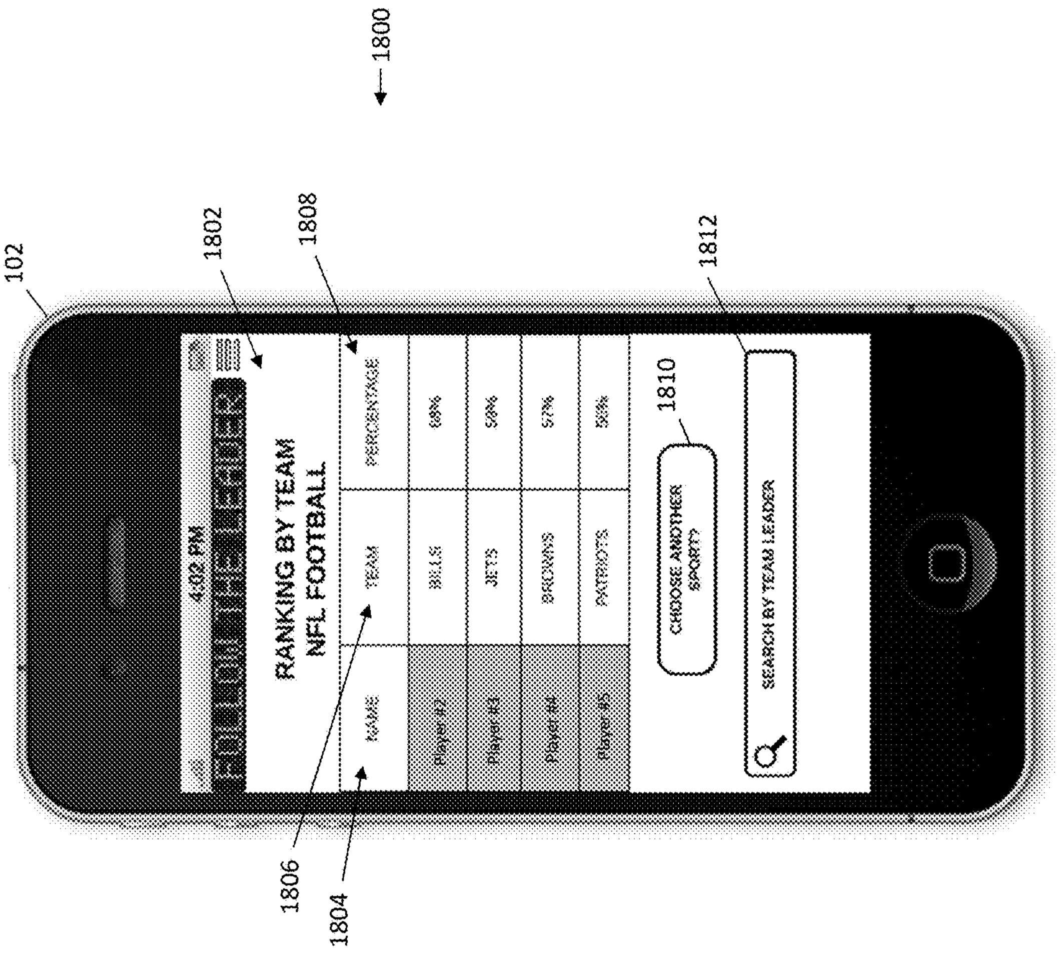

FIG. 18 is a screen capture showing an exemplary user interface 1800 of a sports wagering application, such as application 114 (shown in FIG. 1). More specifically, user interface 1800 illustrates a ranked list 1802 of leaders arranged by sports team. Ranked list 1802 may be compiled by ranking module 122 (shown in FIG. 3) by querying statistics database 124 as described above.

For example, ranked list 1802 may identify each leader 1804 that the user is following, the sports teams 1806 the leader has wagered on, and the win percentage 1808 of each leader for each sports team. In one embodiment, the sports and sports teams listed on ranked list 1802 are customizable by the user such that the user may select the sports and sports teams to be displayed on list 1802. For example, the user may select an additional sports button 1810 to display additional sports teams that the user wishes to see on ranked list 1802. As illustrated in FIG. 18, ranked list 1802 enables a user to quickly identify which sports teams a particular leader has performed strongly in wagering on, and which sports teams a particular leader has performed poorly in wagering on. Ranked list 1802 may also enable the user to select a sport team leader search button 1812 to search for the leaders for each sports team. Accordingly, the user may make an informed choice in which leader to follow and may follow different leaders for different sports teams as desired.

Figure 19:
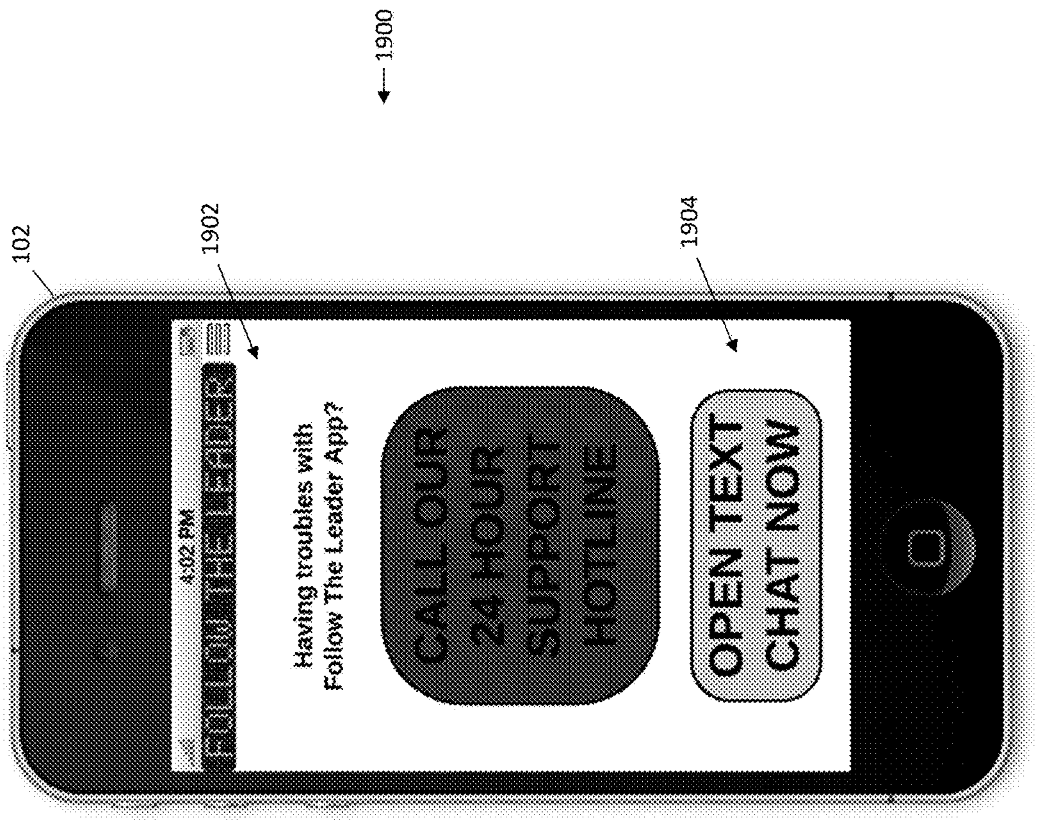

FIG. 19 is a screen capture showing an exemplary user interface 1900 of a sports wagering application, such as application 114 (shown in FIG. 1). More specifically, user interface 1900 illustrates a support interface 1902 that the user may access. In one embodiment, support interface 1902 includes a chat button 1904 that enables the user to initiate a chat session with a support personnel to troubleshoot application 114 or to answer questions about application 114.

Figure 20:
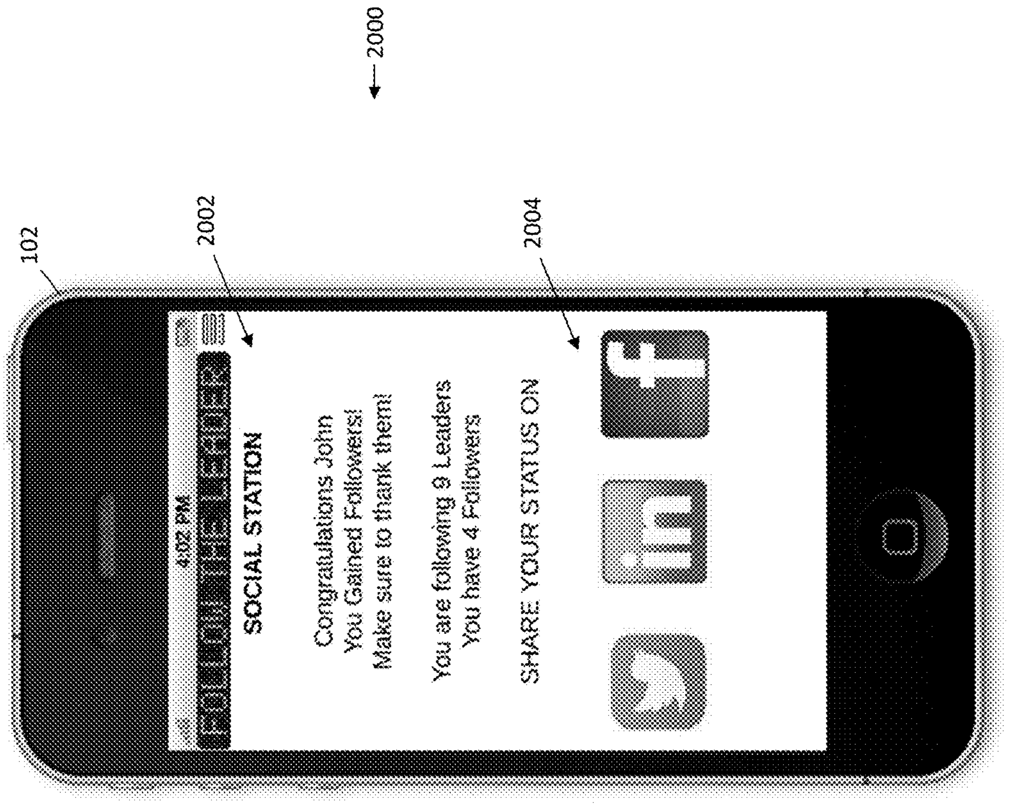

FIG. 20 is a screen capture showing an exemplary user interface 2000 of a sports wagering application, such as application 114 (shown in FIG. 1). More specifically, user interface 2000 illustrates a follower notification interface 2002 that enables a user or leader to view new followers. In one embodiment, follower notification interface 2002 includes one or more social media buttons 2004 that interface with social media module 312 to enable the user to share the follower notifications on one or more social media sites.

Figure 21:
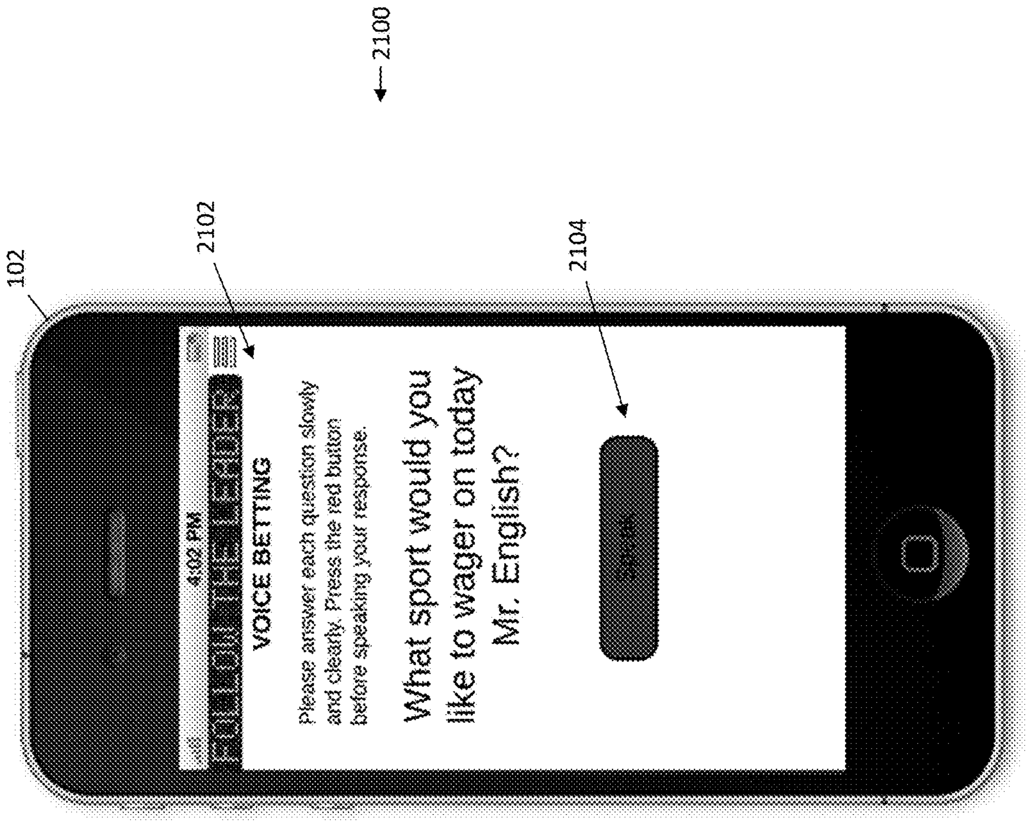

FIG. 21 is a screen capture showing an exemplary user interface 2100 of a sports wagering application, such as application 114 (shown in FIG. 1). More specifically, user interface 2100 illustrates a speech recognition interface 2102 that may be used to operate application 114 by spoken commands. In one embodiment, speech recognition interface 2102 employs a speech recognition module or device such as a microphone with associated speech recognition software. When a user speaks one or more commands to operate application 114, the audio signals representative of the spoken command are transmitted to the speech recognition module and are translated into digital signals that are transmitted to processor 202 of user computing device 102. Processor 202 then correlates the digital signals with one or more operational commands of application 114 and causes application 114 to execute the correlated command or commands to enable application 114 to function as described herein. In one embodiment, the user first presses a speech initiation button 2104 before speaking a command to cause the speech recognition module to capture the audio signals representative of the command.

Figure 22:
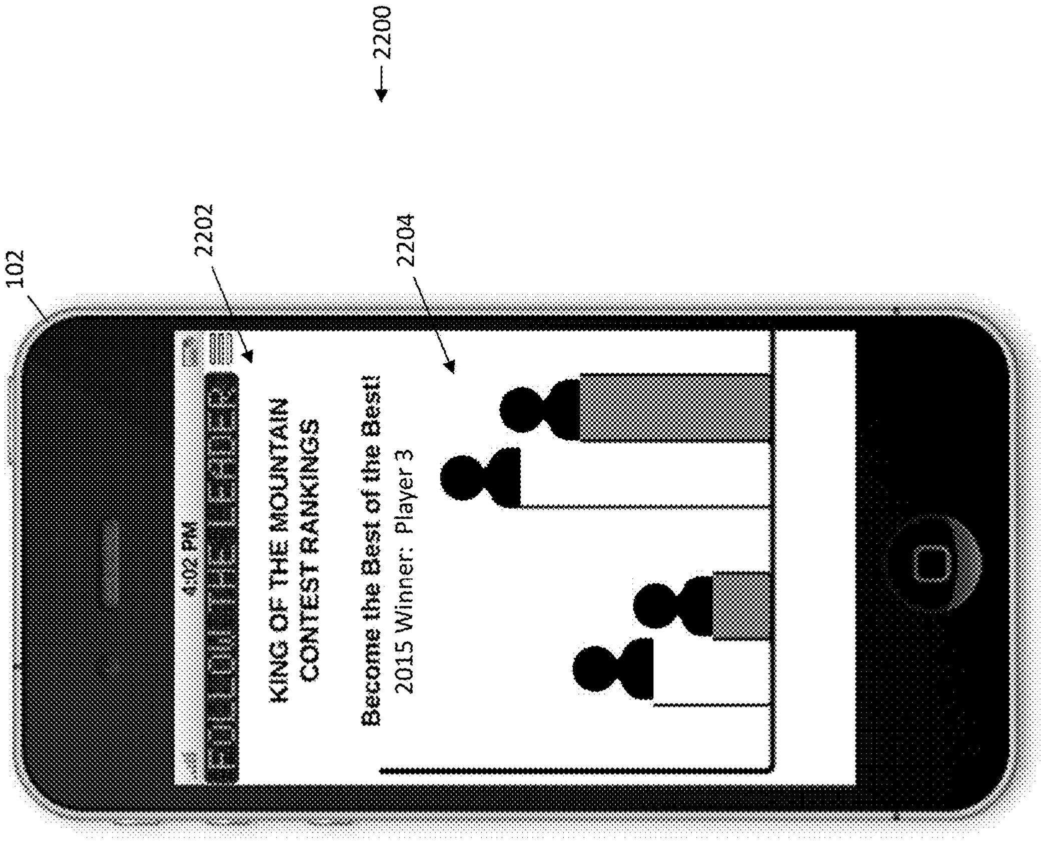

FIG. 22 is a screen capture showing an exemplary user interface 2200 of a sports wagering application, such as application 114 (shown in FIG. 1). More specifically, user interface 2200 illustrates a contest ranking 2202 for a "king of the hill" contest, for example.

In the king of the hill contest, users compete to see who has the highest win percentage or other ranking within a predetermined period of time, such as a month or a year. The users may be ranked and displayed on a table graph 2204 that illustrates the respective win percentages or other rankings, or may be displayed on any other suitable display or graph. The winner of the contest may be awarded a prize in addition to the winnings resulting from winning any wagers that contributed to the contest ranking.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:

a database configured to store results of wagers on at least one prior game for a plurality of players;

a first server configured to:

query the database to receive the results of the wagers for the plurality of players; and determine a ranked list of leaders based at least in part on the results of the wagers for the plurality of players; and an application executable by a processor of a user computing device, wherein the application is configured to:

present the ranked list of leaders to a user using the application on the user computing device;

enable the user to select one of the leaders; and transmit data representative of the selected leader to the first server; and a second server configured to receive the selected leader from the first server and automatically link the user with the selected leader such that when the leader places a wager, the second server automatically places the same wager on behalf of the user;

wherein the second server is configured to distribute a bonus to the selected leader based on the user's wager upon a determination that the leader wins the wager.

2. The system of claim 1, wherein the first server is configured to transmit a follower request to a device operated by the selected leader in response to the user selecting the leader.

3. The system of claim 2, wherein the second server is configured to automatically link the user with the selected leader upon receipt of an approval of the follower request from the selected leader by the first server.

4. The system of claim 1, wherein the application is configured to enable the user to select a maximum wager amount to be automatically placed on behalf of the user.

5. A system, comprising:

a database configured to store results of wagers on at least one prior game for a plurality of players;

a first server configured to:

query the database to receive the results of the wagers for the plurality of players; and determine a ranked list of leaders based at least in part on the results of the wagers for the plurality of players; and an application executable by a processor of a user computing device, wherein the application is configured to:

present the ranked list of leaders to a user using the application on the user computing device;

enable the user to select one of the leaders; and transmit data representative of the selected leader to the first server; and a second server configured to receive the selected leader from the first server and automatically link the user with the selected leader such that when the leader places a wager, the second server automatically places the same wager on behalf of the user;

wherein the application is configured to enable the user to select a maximum wager amount to be automatically placed on behalf of the user; and wherein the second server is configured to automatically place the same wager on behalf of the user with a first wager amount, the second server further configured to reduce the first wager amount to be equal to the maximum wager amount upon a determination that the first wager amount exceeds the maximum wager amount.

6. The system of claim 1, wherein the first server determines a ranked list of leaders for each of a plurality of games.

7. A system, comprising:

a database configured to store results of wagers on at least one prior game for a plurality of players;

a first server configured to:

query the database to receive the results of the wagers for the plurality of players; and determine a ranked list of leaders based at least in part on the results of the wagers for the plurality of players; and an application executable by a processor of a user computing device, wherein the application is configured to:

present the ranked list of leaders to a user using the application on the user computing device:

enable the user to select one of the leaders; and transmit data representative of the selected leader to the first server;

a second server configured to receive the selected leader from the first server and automatically link the user with the selected leader such that when the leader places a wager, the second server automatically places the same wager on behalf of the user; and wherein a leader group includes a leader and all followers of the leader, and wherein the second server is configured to aggregate the amounts to be wagered by each leader group and to determine whether the aggregate amount of the wagers to be made by each leader group exceeds a threshold.

8. The system of claim 7, wherein the second server is configured to reduce the amount of the wagers to be made by a leader group upon a determination that the aggregate amount of the wagers to be made by that leader group is determined to exceed the threshold.

9. The system of claim 7, wherein, for each leader group, the second server is configured to place a single wager with the aggregate amount of the wagers to be made by that leader group.

10. The system of claim 9, wherein the second server is configured to split the single wager into a plurality of wagers upon a determination that the aggregate amount of the wagers to be made by a leader group exceeds the threshold.

11. The system of claim 10, wherein the second server is located within a first jurisdiction, the second server further configured to transmit the plurality of wagers to servers in a plurality of other jurisdictions.

12. A system, comprising:

a database configured to store results of wagers on at least one prior game for a plurality of players;

a first server configured to:

query the database to receive the results of the wagers for the plurality of players; and determine a ranked list of leaders based at least in part on the results of the wagers for the plurality of players; and an application executable by a processor of a user computing device, wherein the application is configured to:

present the ranked list of leaders to a user using the application on the user computing device;

enable the user to select one of the leaders; and transmit data representative of the selected leader to the first server; and a second server configured to receive the selected leader from the first server and automatically link the user with the selected leader such that when the leader places a wager, the second server automatically places the same wager on behalf of the user; and wherein the first server is configured to determine whether the user computing device is located within a first jurisdiction.

13. The system of claim 12, wherein the first server is configured to:

enable the player to create an account upon a determination that the user computing device is located within the first jurisdiction, the account enabling the user to select one or more of the leaders, and prevent the player from creating the account upon a determination that the user computing device is not located within the first jurisdiction.

14. The system of claim 13, wherein, once the account is created and the selected leader is received from the first server, the second server is configured to automatically place the same wager as the selected leader on behalf of the user regardless of whether the user computing device is located within the first jurisdiction.

15. A method, comprising:

storing results of wagers on at least one prior game for a plurality of players in a database;

querying the database, by a first server, to receive the results of the wagers for the plurality of players;

determining, by the first server, a ranked list of leaders based at least in part on the results of the wagers for the plurality of players;

presenting the ranked list of leaders to a user using an application executing on a user computing device;

enabling the user to select one of the leaders;

transmitting data representative of the selected leader to the first server;

receiving, by a second server, the selected leader from the first server; and automatically linking the user with the selected leader using the second server such that when the leader places a wager, the second server automatically places the same wager on behalf of the user; and further comprising distributing a bonus to the selected leader by the second server based on the user's wager upon a determination that the leader wins the wager.

16. The method of claim 15, further comprising transmitting a follower request from the first server to a device operated by the selected leader in response to the user selecting the leader.

17. The method of claim 16, further comprising automatically linking the user with the selected leader by the second server upon receipt of an approval of the follower request from the selected leader by the first server.

18. The method of claim 15, further comprising enabling the user to select a maximum wager amount to be automatically placed on behalf of the user.

19. A method, comprising:

storing results of wagers on at least one prior game for a plurality of players in a database;

querying the database, by a first server, to receive the results of the wagers for the plurality of players;

determining, by the first server, a ranked list of leaders based at least in part on the results of the wagers for the plurality of players;

presenting the ranked list of leaders to a user using an application executing on a user computing device;

enabling the user to select one of the leaders;

transmitting data representative of the selected leader to the first server;

receiving, by a second server, the selected leader from the first server; and automatically linking the user with the selected leader using the second server such that when the leader places a wager, the second server automatically places the same wager on behalf of the user;

further comprising enabling the user to select a maximum wager amount to be automatically placed on behalf of the user; and comprising automatically placing the same wager on behalf of the user with a first wager amount by the second server, and reducing the first wager amount to be equal to the maximum wager amount upon a determination that the first wager amount exceeds the maximum wager amount.

20. The method of claim 15, further comprising determining a ranked list of leaders for each of a plurality of games.

21. A method, comprising:

storing results of wagers on at least one prior game for a plurality of players in a database;

querying the database, by a first server, to receive the results of the wagers for the plurality of players;

determining, by the first server, a ranked list of leaders based at least in part on the results of the wagers for the plurality of players;

presenting the ranked list of leaders to a user using an application executing on a user computing device;

enabling the user to select one of the leaders;

transmitting data representative of the selected leader to the first server;

receiving, by a second server, the selected leader from the first server; and automatically linking the user with the selected leader using the second server such that when the leader places a wager, the second server automatically places the same wager on behalf of the user; and wherein a leader group includes a leader and all followers of the leader, the method further comprising aggregating the amounts to be wagered by each leader group by the second server and determining whether the aggregate amount of the wagers to be made by each leader group exceeds a threshold.

22. The method of claim 21, further comprising reducing the amount of the wagers to be made by a leader group by the second server upon a determination that the aggregate amount of the wagers to be made by that leader group is determined to exceed the threshold.

23. The method of claim 21, further comprising, for each leader group, placing a single wager with the aggregate amount of the wagers to be made by that leader group using the second server.

24. The method of claim 23, further comprising splitting the single wager into a plurality of wagers by the second server upon a determination that the aggregate amount of the wagers to be made by a leader group exceeds the threshold.

25. The method of claim 24, wherein the second server is located within a first jurisdiction, the method further comprising transmitting the plurality of wagers from the second server to servers in a plurality of other jurisdictions.

26. A method, comprising:

storing results of wagers on at least one prior game for a plurality of players in a database;

querying the database, by a first server, to receive the results of the wagers for the plurality of players;

determining, by the first server, a ranked list of leaders based at least in part on the results of the wagers for the plurality of players;

presenting the ranked list of leaders to a user using an application executing on a user computing device;

enabling the user to select one of the leaders;

transmitting data representative of the selected leader to the first server;

receiving, by a second server, the selected leader from the first server; and automatically linking the user with the selected leader using the second server such that when the leader places a wager, the second server automatically places the same wager on behalf of the user; and further comprising determining whether the user computing device is located within a first jurisdiction.

27. The method of claim 26, further comprising:

enabling, by the first server, the player to create an account upon a determination that the user computing device is located within the first jurisdiction, wherein the account enables the user to select one or more of the leaders, and preventing, by the first server, the player from creating the account upon a determination that the user computing device is not located within the first jurisdiction.

28. The method of claim 27, further comprising automatically placing, by the second server, the same wager as the selected leader on behalf of the user regardless of whether the user computing device is located within the first jurisdiction after the account has been created and the selected leader has been received from the first server.

* * * * *